US009479732B1

(12) United States Patent
Saleh et al.

(10) Patent No.: US 9,479,732 B1
(45) Date of Patent: Oct. 25, 2016

(54) IMMERSIVE VIDEO TELECONFERENCING ROBOT

(71) Applicant: iRobot Corporation, Bedford, MA (US)

(72) Inventors: Youssef Saleh, Arlington, MA (US);
Cheuk Wah Wong, Concord, MA (US); Marcio Macedo, Cambridge, MA (US); Stephen O'Dea, Chelmsford, MA (US); Craig S. K. Clapp, Boxford, MA (US)

(73) Assignee: iRobot Corporation, Bedford, MA (US)

( * ) Notice: Subject to any disclaimer, the term of this patent is extended or adjusted under 35 U.S.C. 154(b) by 0 days.

(21) Appl. No.: 14/937,368

(22) Filed: Nov. 10, 2015

(51) Int. Cl.
*H04N 7/15* (2006.01)
*H04N 5/247* (2006.01)
*H04N 5/232* (2006.01)
*B25J 11/00* (2006.01)
*B25J 9/16* (2006.01)

(52) U.S. Cl.
CPC .............. *H04N 7/15* (2013.01); *B25J 9/1689* (2013.01); *B25J 9/1697* (2013.01); *B25J 11/0005* (2013.01); *H04N 5/23238* (2013.01); *H04N 5/23296* (2013.01); *H04N 5/247* (2013.01); *Y10S 901/01* (2013.01)

(58) Field of Classification Search
CPC ........ H04N 7/185; H04N 7/141; H04N 7/14; H04N 7/15; H04N 7/147; H04N 7/142; H04N 7/144; H04N 7/157; G06F 1/1601; G06F 1/1605; G06F 3/011
USPC ............ 348/14.01–14.16, 153; 700/245, 259
See application file for complete search history.

(56) References Cited

U.S. PATENT DOCUMENTS

| 7,626,569 B2 * | 12/2009 | Lanier | G06F 1/1601 345/156 |
| 7,949,616 B2 * | 5/2011 | Levy | B25J 9/1689 706/11 |
| 2004/0170300 A1 * | 9/2004 | Jouppi | G06K 9/00228 382/103 |

\* cited by examiner

*Primary Examiner* — Melur Ramakrishnaiah
(74) *Attorney, Agent, or Firm* — Myers Bigel & Sibley, P.A.

(57) ABSTRACT

A method includes receiving, at a mobile teleconferencing robot, a remote user input to alter a viewing state of a vision system of the robot. The vision system includes a forward imaging sensor arranged to capture a forward video feed, a right imaging sensor arranged to capture a right video feed, and a left imaging sensor arranged to capture a left video feed, each with respect to a forward drive direction of the mobile teleconferencing robot. The method includes altering the viewing state of the vision system by adjusting a tilt angle and/or a zoom level of the forward imaging sensor based on the remote user input and generating a combined video feed that provides an immersive peripheral view about the robot. The combined video feed is generated by combining the forward video feed with a portion of the right video feed and a portion of the left video feed.

30 Claims, 33 Drawing Sheets

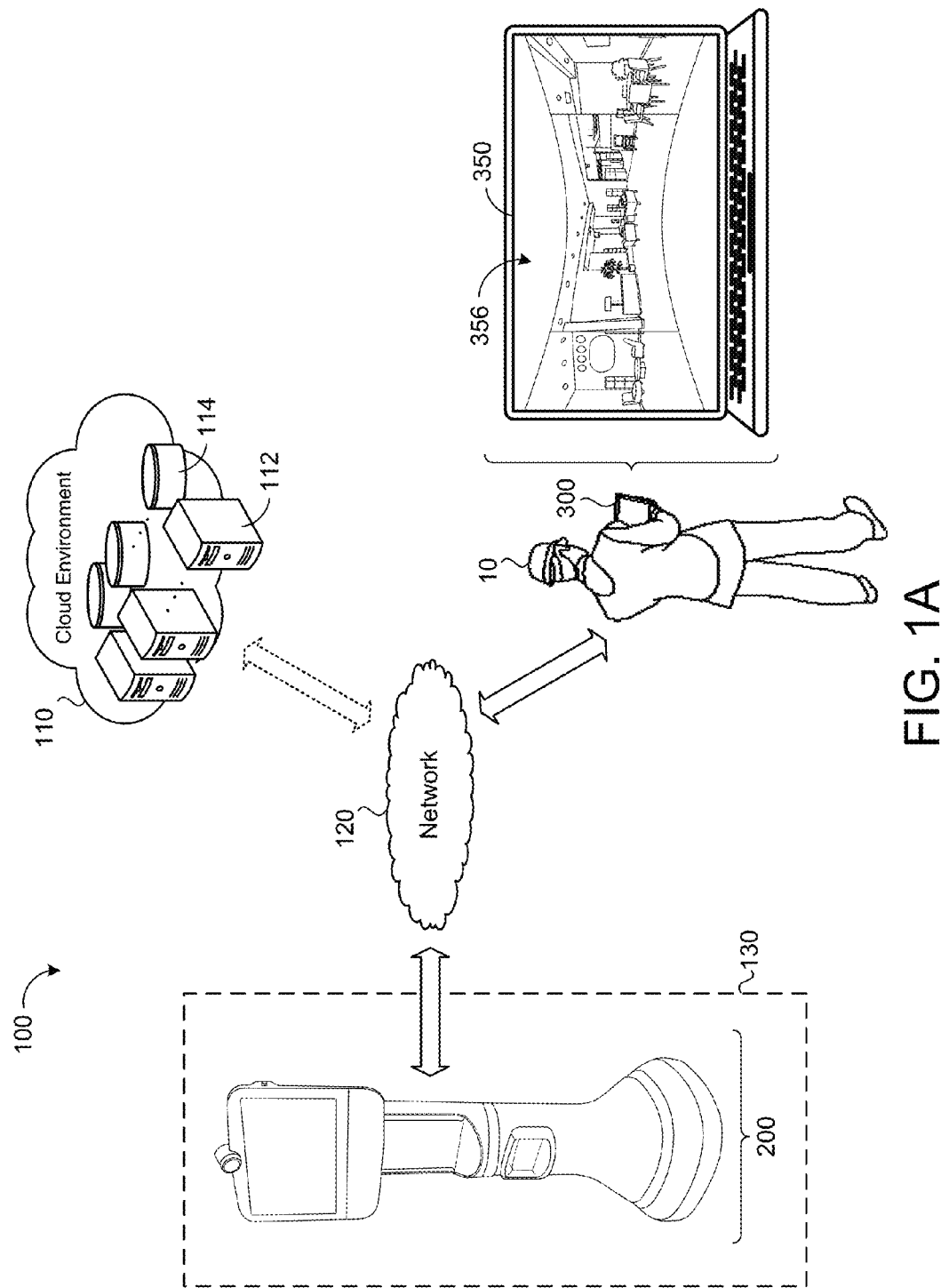

IMMERSIVE VIDEO TELECONFERENCING ROBOT

TECHNICAL FIELD

This disclosure relates generally to mobile robots and, more specifically, to providing an immersive video experience for a remote user of a mobile robot.

BACKGROUND

A robot is generally an electro-mechanical machine guided by a computer or electronic programming. Mobile robots have the capability to move around in their environment and are not fixed to one physical location. An example of a mobile robot that is in common use today is an automated guided vehicle or automatic guided vehicle (AGV). An AGV is generally a mobile robot that follows markers or wires in the floor, or uses a vision system or lasers for navigation. Some robots use a variety of sensors to obtain data about their surrounding environments, for example, for navigation or obstacle detection and person following. Moreover, some robots use imaging sensors to capture still images or video of objects in their surrounding environments.

High quality video conferencing using mobile devices, tablets, and portable computers has enabled telepresence robots to provide a better sense of remote physical presence for communication and collaboration in the office, home, school, etc. when one cannot be there in person. There have been two primary approaches that both utilize videoconferencing on a display: 1) desktop telepresence robots, which typically mount a phone or tablet on a motorized desktop stand to enable the remote person to look around a remote environment by panning and tilting the display; and 2) drivable telepresence robots, which typically contain a display (integrated or separate phone or tablet) mounted on a roaming platform. These approaches for video conferencing with the use of telepresence robots have failed to provide a remote user with an experience similar to or better than an actual presence at the remote environment.

SUMMARY

A telepresence or video collaboration robot disclosed herein can provide a remote user with freedom of movement and physical presence at remote locations while experiencing an immersive peripheral awareness about the robot using a vision system and/or other sensors of the robot. The vision system may include a forward imaging sensor disposed on the robot and arranged to have a forward field of view aimed along a forward drive direction of the robot to capture a forward video feed. The vision system may include one or more peripheral imaging sensors to capture a peripheral video feed. For example, the robot may include right and left imaging sensors arranged to have corresponding right and left fields of view aiming in opposite directions and perpendicular to the forward field of view. The robot can generate a combined video feed that combines the forward video feed and the peripheral video feed to provide the remote user an immersive video experience that the offers the remote user a peripheral awareness about the robot.

One aspect of the disclosure provides a method that includes receiving, at a mobile teleconferencing robot maneuverable across a ground surface, a remote user input to alter a viewing state of a vision system of the mobile teleconferencing robot. The vision system includes a forward imaging sensor, a right imaging sensor, and a left imaging sensor. The forward imaging sensor is arranged on a top portion of the mobile teleconferencing robot at a first location to have a forward field of view aimed along a forward drive direction of the mobile teleconferencing robot and configured to capture a forward video feed. The right imaging sensor is arranged on a right portion of the mobile teleconferencing robot at a second location vertically apart from the first location to have a right field of view aimed in a right direction with respect to the forward drive direction. The right imaging sensor is configured to capture a right video feed. The left imaging sensor is arranged on a left portion of the mobile teleconferencing robot at a third location vertically apart from the first location to have a left field of view aimed in a left direction with respect to the forward drive direction. The left imaging sensor is configured to capture a left video feed. The left and right imaging sensors are located along side edge portions of a head of the mobile teleconferencing robot, such as a video screen head (e.g., a monitor or tablet), and the forward imaging sensor is located along a top edge portion of the head of the mobile robot. The left, right and forward imaging sensors are not co-located but disposed about the periphery of the head for unimpeded viewing of their respective portions of the environment around the robot 200. The method includes altering the viewing state of the vision system by adjusting a tilt angle of the forward imaging sensor with respect to a vertical axis of the mobile teleconferencing robot and/or a zoom level of the forward imaging sensor based on the remote user input and generating a combined video feed that provides an immersive peripheral view about the mobile teleconferencing robot. The combined video feed is generated by combining the forward video feed with a portion of the right video feed and a portion of the left video feed. The combined video feed includes video feed dividers between the forward video feed, the portion of the right video feed, and the portion of the left video feed. Each video feed divider has a position and a lean angle with respect to a vertical viewing axis based on the altered viewing state of the vision system. The method also includes outputting the combined video feed from the robot to a remote computing system.

Implementations of the disclosure may include one or more of the following optional features. In some implementations, the right and left imaging sensors are aimed away from each other and at least partially away from the forward drive direction, and the right and left fields of view at least partially overlap the forward field of view. The lean angle of each video feed divider may be based on the tilt angle of the forward imaging sensor. When the forward imaging sensor is tilted upward, the video feed dividers lean toward each other, and top ends of the video feed dividers are closer to each other than bottom ends of the video feed dividers. When the forward imaging sensor is tilted downward, the video feed dividers lean away from each other, and the top ends of the video feed dividers are further apart from each other than the bottom ends of the video feed dividers. Moreover, the lateral position of each video feed divider may be based on the zoom level of the forward imaging sensor. When the forward imaging sensor is at a zoomed-in focal range, the video feed dividers are further apart from each other than when the forward imaging sensor is at a zoomed-out focal range.

In some implementations, when the forward imaging sensor is tilted downward, the video feed dividers lean toward each other, and top ends of the video feed dividers are closer to each other than bottom ends of the video feed dividers. When the forward imaging sensor is tilted upward, the video feed dividers lean away from each other, and the top ends of the video feed dividers are further apart from each other than the bottom ends of the video feed dividers.

In some implementations, the forward imaging sensor includes a wide-angle lens and the forward field of view has a horizontal field of view of about 100 degrees. The right and left imaging sensors may each include a fish-eye lens, and the corresponding right and left fields of view each has a horizontal field of view of about 180 degrees and a vertical field of view of about 135 degrees. In some implementations, the horizontal field of view presented in the combined video feed spans at least 220 degrees.

Generating the combined video feed may include selecting the portion of the right video feed and the portion of the left video feed based on at least one of the tilt angle of the forward imaging sensor, the zoom level of the forward imaging sensor, or a vertical field of view offset of the forward imaging sensor relative to the field of view of the right imaging sensor and/or the field of view of the left imaging sensor relative to a viewing horizon. The generating of the combined video feed may also include scaling the right video feed and the left video feed to each have a similar scale of the forward video feed and arranging the portion of the right video feed and the portion of the left video feed relative to the forward video feed. In some examples, the method includes at least one of correcting wide angle distortion of the video feeds, color matching the video feeds, blending the video feeds, or scaling the video feeds.

In some implementations, generating the combined video feed includes correcting wide angle distortion of the video feeds, mapping the distortion corrected right and left video feeds onto a hemispherical surface, cropping and/or scaling the distortion corrected right and left video feeds, and overlaying the distortion corrected video feeds. The distortion corrected video feeds each have a right edge and a left edge. The left edge of the right video feed is arranged relative to the right edge of the forward video feed and a right video feed divider therebetween. Similarly, the right edge of the left video feed is arranged relative to the left edge of the forward video feed and a left video feed divider therebetween. "Overlay" here therefore does not mean matching features from the forward video feed with features from the left and/or right video feeds and laying one feed over the other to create an uninterrupted panoramic view. Instead, here, overlay means combining portions of the forward and peripheral video feeds so that they are sized similarly and so that their horizons align where the video feeds are abutted at the video feed dividers.

Correcting the wide angle distortion of the video feeds may include mapping pixels of the forward video feed to a tangent plane, fitting the pixels of the forward video feed into a corresponding grid of the tangent plane, and cropping the mapped and fitted forward video feed to fit an aspect ratio. Correcting the wide angle distortion of the video feeds may also include dewarping the right and left video feeds (e.g., to panoramic video feeds) and texture-mapping the dewarped right and left video feeds onto a spherical surface.

Another aspect of the disclosure provides a robot that includes a robot body defining a forward drive direction and a robot head supported by the robot body. The robot head has a top portion, a right-side portion, and a left-side portion. The robot includes a forward imaging sensor, a right imaging sensor, and a left imaging sensor. The forward imaging sensor is moveably disposed on the top portion of the robot head at a first location and aimed along the forward drive direction and is configured to capture a forward video feed.

The right imaging sensor is disposed on the right-side portion of the robot head at a second location vertically spaced from the first location with respect to a ground surface supporting the robot. The right imaging sensor is aimed outward from a right portion of the teleconferencing robot and arranged to have a right field of view aimed at least partially away from the forward drive direction. Moreover, the right imaging sensor is configured to capture a right video feed. The left imaging sensor is aimed outward from a left portion of the teleconferencing robot and disposed on the left-side portion of the robot head at a third location vertically spaced from the first location with respect to the ground surface. The left imaging sensor is arranged to have a left field of view aimed at least partially away from the forward drive direction. The left imaging sensor is configured to capture a left video feed. The left and right imaging sensors are located along side edge portions of a head of the mobile teleconferencing robot, such as a video screen head (e.g., a monitor or tablet), and the forward imaging sensor is located along a top edge portion of the head of the mobile robot. The left, right and forward imaging sensors are not co-located, but disposed about the periphery of the head for unimpeded viewing of their respective portions of the environment around the robot 200. The robot also includes data processing hardware in communication the forward imaging sensor, the right imaging sensor, and the left imaging sensor. The data processing hardware is configured to generate a combined video feed that provides an immersive peripheral view about the robot by combining the forward video feed with a portion of the right video feed and a portion of the left video feed. The combined video feed includes video feed dividers between the forward video feed, the portion of the right video feed, and the portion of the left video feed. Each video feed divider has a position and a lean angle with respect to a vertical viewing axis based on a tilt angle of the forward imaging sensor with respect to a vertical axis of the robot and/or a zoom level of the forward imaging sensor.

This aspect may include one or more of the following optional features. The robot may include a drive system supporting the robot body on the ground surface and configured to maneuver the robot across the ground surface while the imaging sensors capture corresponding video feeds. The forward imaging sensor may include a wide-angle lens and the forward field of view may have a horizontal field of view of about 100 degrees. Moreover, the right and left imaging sensors may each include a fish-eye lens, and the right and left fields of view may each have a horizontal field of view of about 180 degrees and a vertical field of view of about 135 degrees. In some examples, the right and left imaging sensors are aimed away from each other in opposite directions, and the right and left fields of view may each capture a hemispherical field of view (e.g., where combination of the right and left hemispherical fields of view form a spherical field of view). In additional examples, the right and left imaging sensors are positioned at a common vertical height with respect to the ground surface. For example, the right and left imaging sensors may reside in a common x-y plane spaced vertically z from the forward imaging sensor. Furthermore, the right and left imaging sensors may reside in a common vertical plane (z-plane) with the forward imaging sensor.

In some implementations, the video feed dividers move in response to a change in viewing state of the forward imaging sensor. Each video feed divider has a top end and a bottom end. When the forward imaging sensor is tilted upward, the video feed dividers lean toward each other, and the top ends of the video feed dividers are closer to each other than the bottom ends of the video feed dividers. When the forward imaging sensor is tilted downward, the video feed dividers lean away from each other, and the top ends of the video feed dividers are further apart from each other than the bottom ends of the video feed dividers. In some examples, a position of the video feed dividers varies based on the change in viewing state of the forward imaging sensor. For example, when the forward imaging sensor is at a zoomed-in focal range, the video feed dividers are further apart from each other than when the forward imaging sensor is at a zoomed-out focal range.

Generating the combined video feed may include selecting the portion of the right video feed and the portion of the left video feed based on at least one of the tilt angle of the forward imaging sensor, the zoom level of the forward imaging sensor, or a vertical field of view offset of the forward imaging sensor relative to the field of view of the right imaging sensor and/or the field of view of the left imaging sensor relative to a viewing horizon. The generating of the combined video feed may also include scaling the right video feed and the left video feed to each have a similar scale of the forward video feed and arranging the portion of the right video feed and the portion of the left video feed relative to the forward video feed. In some examples, the generating of the combined video feed includes at least one of correcting wide angle distortion of the video feeds, color matching the video feeds, blending the video feeds, or scaling the video feeds.

Yet another aspect of the disclosure provides a method that includes receiving, at data processing hardware of a mobile teleconferencing robot, a forward video feed, a right video feed, and a left video feed from a vision system of the mobile teleconferencing robot. The vision system includes a forward imaging sensor, a right imaging sensor, and a left imaging sensor. The forward imaging sensor is arranged on a top portion of the mobile teleconferencing robot at a first location to have a forward field of view aimed along a forward drive direction of the mobile teleconferencing robot and is configured to capture the forward video feed. The right imaging sensor is aimed outward from a right portion of the teleconferencing robot and arranged on a right portion of the mobile teleconferencing robot at a second location apart from the first location to have a right field of view aimed at least partially away from the forward drive direction. The right imaging sensor is configured to capture the right video feed. The left imaging sensor is aimed outward from a left portion of the teleconferencing robot and arranged on a left portion of the mobile teleconferencing robot at a third location apart from the first location to have a left field of view aimed at least partially away from the forward drive direction. The left imaging sensor is configured to capture the left video feed. The right field of view and the left field of view each have a horizontal field of view of about 180 degrees. The method further includes generating, by the data processing hardware, a full peripheral video feed by combining the right and left video feeds and generating, by the data processing hardware, an overlaid immersive video feed by correcting a wide angle distortion of the forward video feed and overlaying the distortion corrected forward video feed on the full peripheral video feed. The overlaid immersive video feed provides a forward and peripheral view about the mobile teleconferencing robot. The method also includes outputting the overlaid immersive video feed from the data processing hardware to a remote computing system. "Overlay" here does not mean matching features from the forward video feed with features from the left and/or right video feeds and laying one feed over the other to create an uninterrupted panoramic view. Instead, here, overlay means combining portions of the forward and peripheral video feeds so that they are sized similarly and so that their horizons align where the video feeds are abutted at the video feed dividers.

This aspect may include one or more of the following optional features. In some implementations, the forward imaging sensor includes a wide-angle lens and the forward field of view has a horizontal field of view of about 100 degrees. In addition, the right and left imaging sensors may each include a fish-eye lens, and the right and left fields of view each have a vertical field of view of about 135 degrees. In some examples, the right and left imaging sensors are vertically spaced from the forward imaging sensor with respect to a ground surface supporting the mobile teleconferencing robot. The right and left imaging sensors may have about the same vertical height with respect to the ground surface and may be arranged to have the right field of view and the left field of view aiming in substantially opposite directions.

Generating the full peripheral video feed may include dewarping the right and left video feeds and texture-mapping the dewarped right and left video feeds onto a spherical surface. In some examples, correcting the wide angle distortion of the forward video feed includes mapping pixels of the forward video feed to a tangent plane, fitting the pixels of the forward video feed into a corresponding grid of the tangent plane, and cropping the mapped and fitted forward video feed to fit an aspect ratio. In additional examples, correcting the wide angle distortion of the forward video feed includes adjusting a normalized radius of each pixel of the forward video feed using a polynomial equation. A placement location of the distortion corrected forward video feed on the full peripheral video feed may be based on a tilt angle of the forward imaging sensor with respect to a vertical axis of the mobile teleconferencing robot. Moreover, a scale of the distortion corrected forward video feed may be based on a zoom level of the forward imaging sensor.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 1A is a schematic view of an example system for providing an immersive video experience for a remote user.

FIG. 2I is a screen view of an image of the premise of FIG. 2H, which may be displayed on a screen of a user device.

Like reference symbols in the various drawings indicate like elements.

DETAILED DESCRIPTION

Figure 1B:
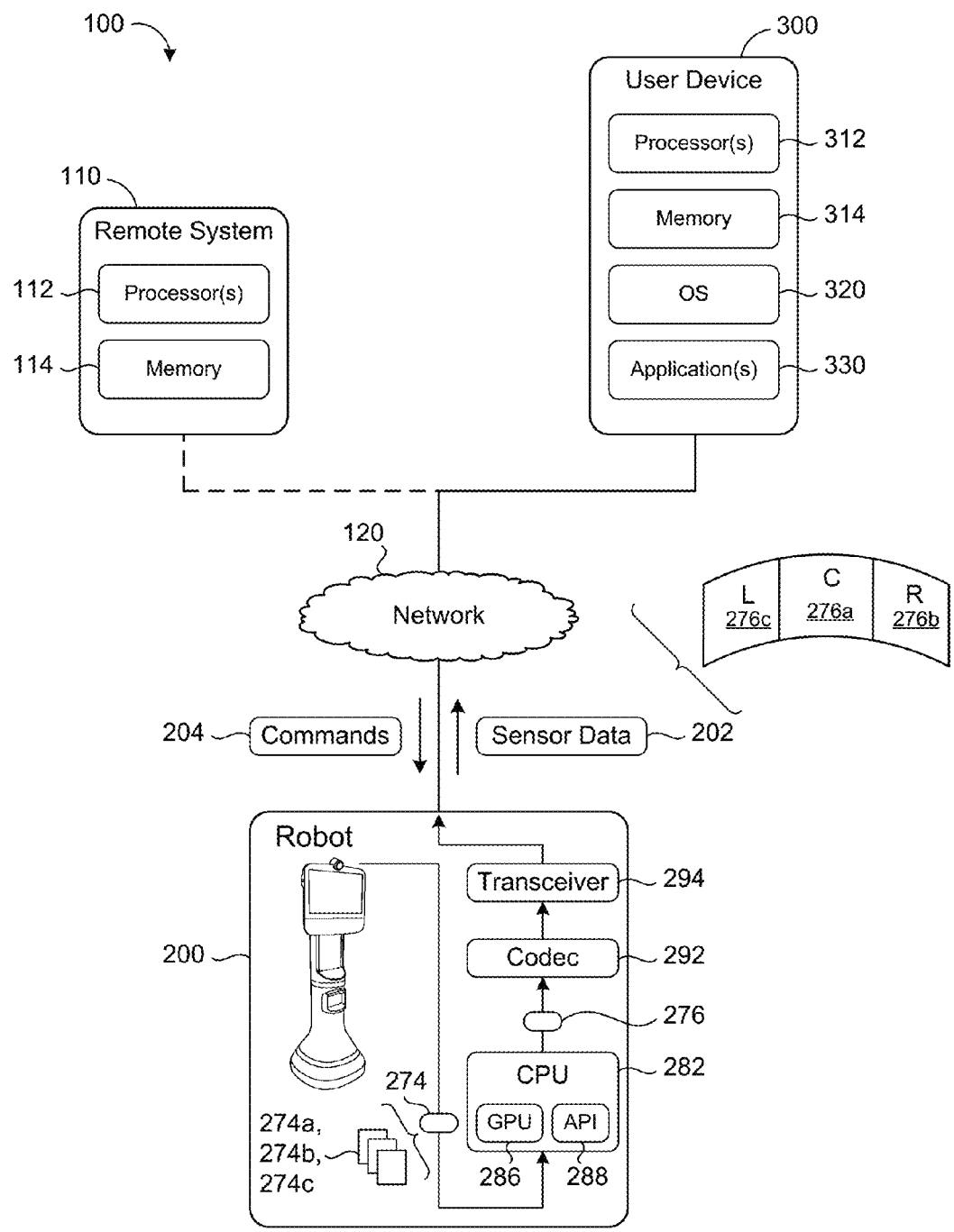
FIG. 1B is a functional block diagram of the system of FIG. 1A.

While audio connections, content sharing systems, and real-time video connections have allowed people to become more connected to other people and events (such as conferences, meetings, inspections) at remote locations, such systems fall short of providing a remote user with a full immersive experience that simulates in-person presence at the event. A telepresence or video collaboration robot (referred to herein as the robot) provides a user with freedom of movement and physical presence at remote locations to achieve a more personal degree of collaboration within a dispersed work environment. While video conferencing with one or more people through the robot, a remote user generally wishes to experience a collaboration session that is similar to or better than an actual presence with the one or more people. This experience can be achieved by providing a remote user with a peripheral awareness, such as a field of view, from the robot that is similar to or better than a human's peripheral awareness. Moreover, other experience enhancements may include identification of people or objects with linked access to information about those identified people or objects.

FIG. 1A illustrates an example system 100 for providing an immersive video experience for a remote user 10. In some implementations, the system 100 includes a robot 200 in communication with a user device 300 associated with a remote user 10 and optionally in communication with a remote system 110. The robot 200 may reside at a premise 130, which is located at a distance from the remote user 10 and the remote system 110. The robot 200 provides the user 10 with a telepresence at the premise 130 despite the user 10 having an actual presence at a location remote from the premise 130. The user device 300 includes a screen 350 on which the user 10 views images and/or video feeds of the premise 130. Communication between the robot 200 and the user device 300 or the remote system 110 may be accomplished through a network 120. The network 120 may include various types of networks, such as a local area network (LAN), a wide area network (WAN), and/or the Internet. The remote system 110 may be a distributed system (e.g., a cloud environment) having scalable/elastic computing resources 112 (e.g., data processing hardware) and/or storage resources 114 (e.g., memory hardware).

FIG. 1B provides a functional block diagram of the system 100. As shown, the robot 200 delivers sensor data 202, via the network 120, to the user device 300 and/or the remote system 110 and may receive commands 204 therefrom. The network 120 delivers the sensor data 202 in real time to the user device 300 and/or the remote system 110. The user device 300 can be any computing device capable of communicating with the robot 200 and/or the remote system 110. User devices 300 include, but are not limited to, mobile computing devices (such as laptops, tablets, and smart phones) and wearable computing devices (such as headsets and watches). User devices 300 may also include other computing devices having other form factors, such as computing devices included in desktop computers, gaming devices, televisions, or other appliances.

The user device 300 includes data processing hardware 312, which may execute a variety of different operating systems stored in memory hardware 314 in communication with the data processing hardware 312. In examples where the user device 300 is a mobile device, the user device 300 may run an operating system 320 including, but not limited to, ANDROID® developed by Google Inc., IOS® developed by Apple Inc., or WINDOWS PHONE® developed by Microsoft Corporation. Accordingly, the operating system 320 running on the user device 300 may include, but is not limited to, one of ANDROID®, IOS®, or WINDOWS PHONE®. In an example where the user device 300 is a laptop or desktop computing device, the user device 300 may run an operating system 320 including, but not limited to, MICROSOFT WINDOWS® by Microsoft Corporation, MAC OS® by Apple, Inc., or Linux. The user device 300 may also access the robot 200 and/or the remote system 110 while running operating systems 320 other than those operating systems described above, whether presently available or developed in the future.

In some implementations, the user device 300 executes one or more software applications 330 (for example, a telepresence application). A software application 330 refers to computer software that, when executed by the data processing hardware 312, causes the data processing hardware 312 to perform a task. In some examples, a software application 330 is referred to as an "application", an "app", or a "program". The functionality of the application 330 may be accessed on the user device 300 on which the application 330 is installed. Additionally or alternatively, the functionality of an application 330 is accessed via the data processing hardware 112 of the remote system 110 (e.g., via the network 120 or the Internet). In some examples, all of an application's functionality is included on the user device 300 on which the application 330 is installed. As such, these applications 330 may function without communication with other computing devices. In other examples, an application 330 installed on the user device 300 accesses information from other remote hardware during operation, such as the memory hardware 114 of the remote system 110. In still other examples, a web-based application 330 (also referred to herein as a web application) is partially executed by the data processing hardware 312 of the user device 300 and partially executed by remote data processing hardware. For example, a web-based application 330 may be an application 330 that is executed, at least in part, by a web server and accessed by a web browser (e.g., a native application) of the user device 300. Additionally, portions of the functionality of an application 330 may be performed by other remote data processors, such as the data processing hardware 112 of the remote system 110.

Figure 2A:
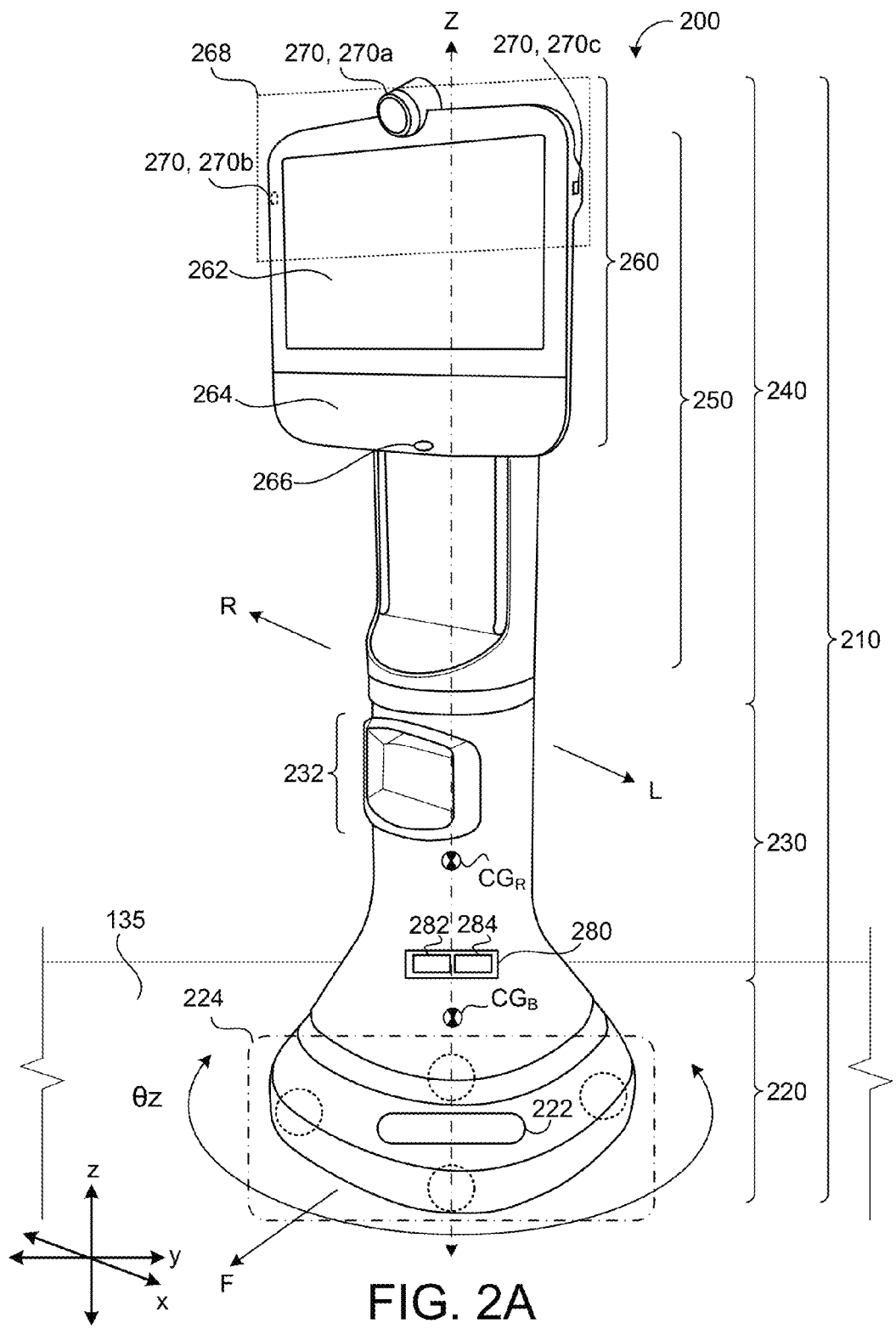
FIG. 2A is a perspective view of an example mobile robot capable of functioning as part of the system of FIG. 1A.
Figure 2B:
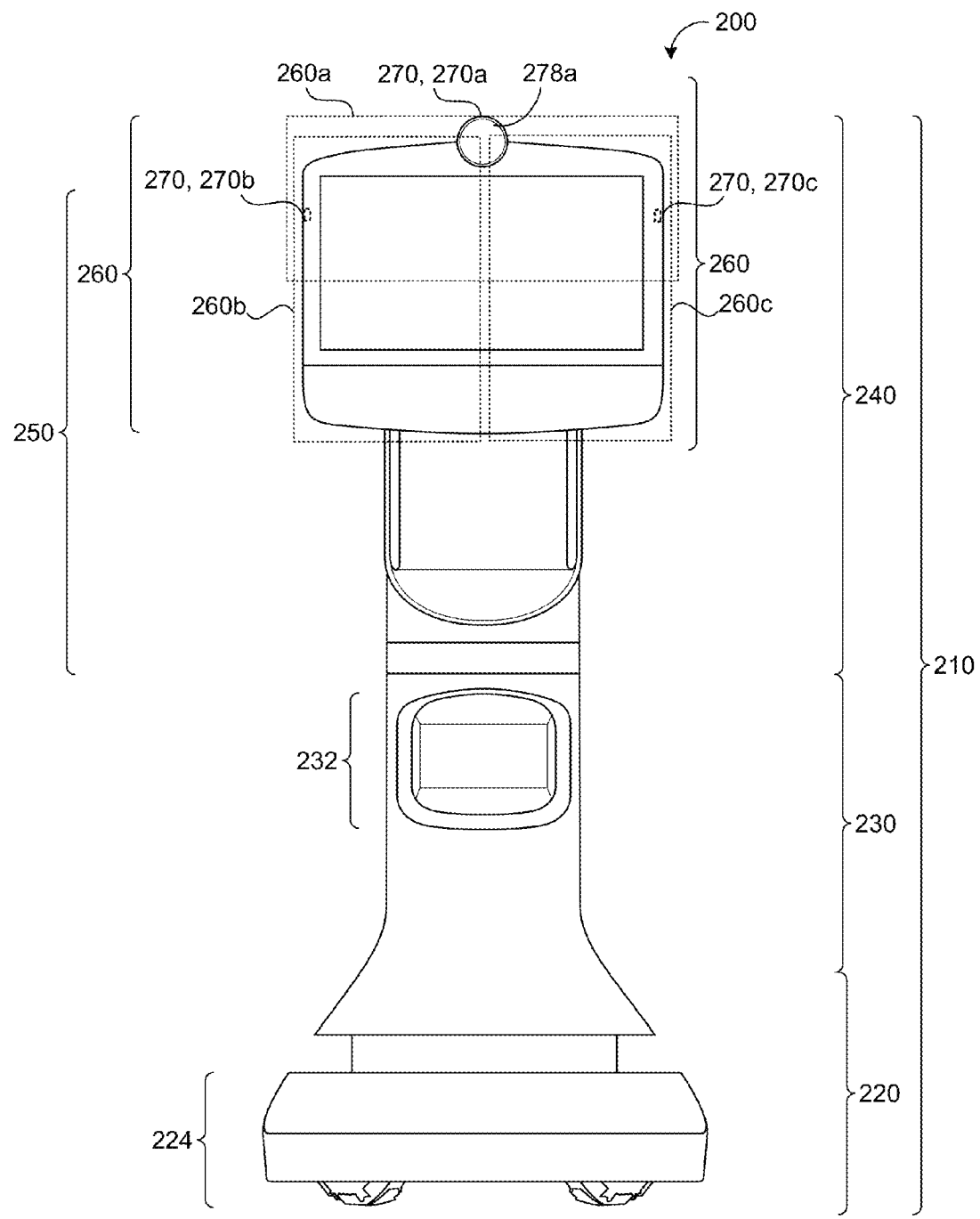
FIG. 2B is a front view of the mobile robot of FIG. 2A.
Figure 2C:
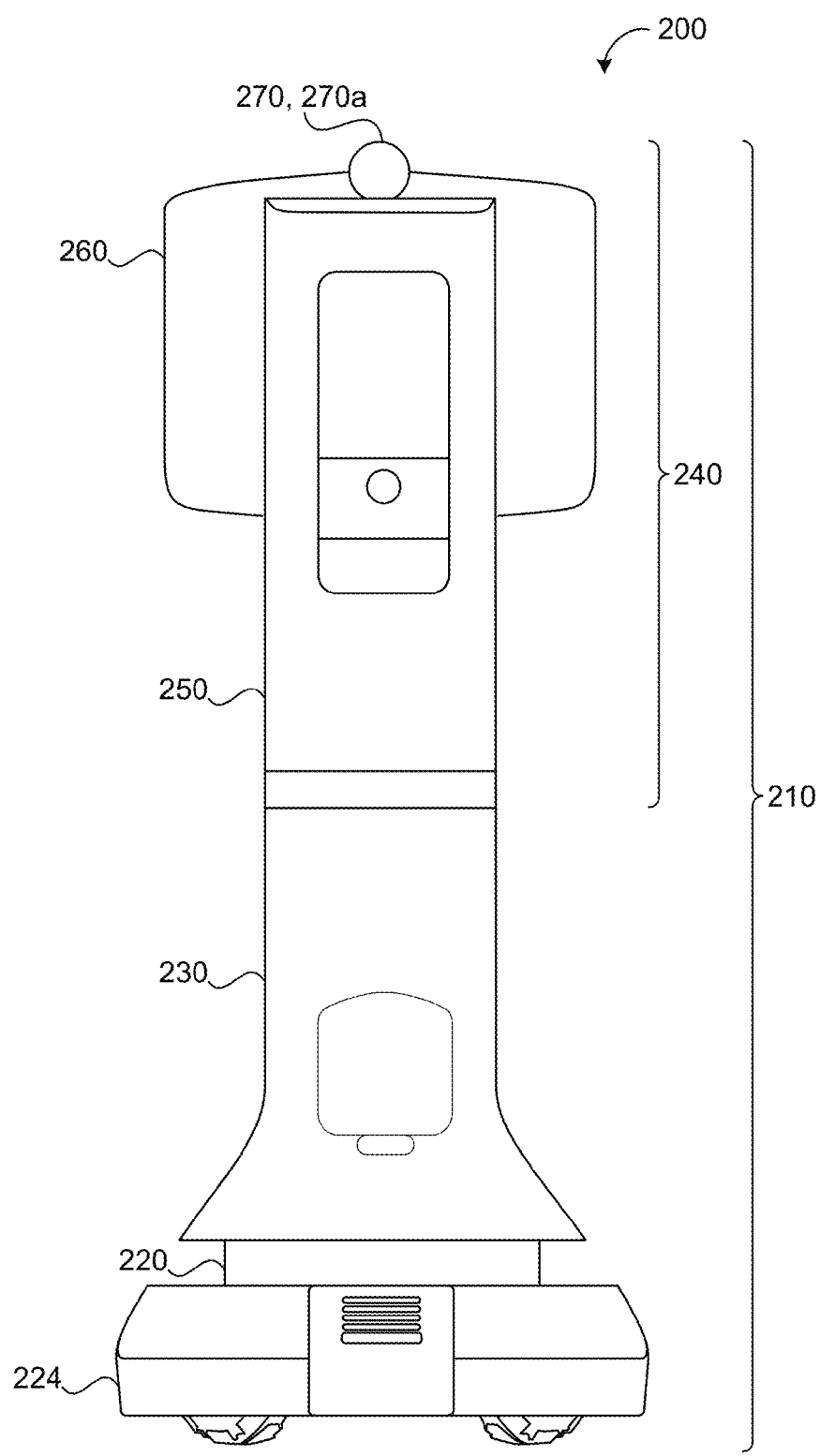
FIG. 2C is a rear view of the mobile robot of FIG. 2A.

The sensor data 202 transmitted by the robot 200 through the network 120 may include raw or processed data originating from one or more sensors of the robot 200, which may include imaging sensors 270 (see FIG. 2A) or a sensor module 232 (see FIG. 2A) having imaging and/or proximity sensors. Raw sensor output signals, such as raw image data 274 from one or more imaging sensors 270 of the robot 200, is streamed to a computing device, such as a central processing unit (CPU) 282, of the robot 200, as illustrated in FIG. 1B. The computing device 282 that receives the raw image data 274 may de-warp, clip, crop, correct, overlay, or otherwise transform or process the raw image data 274. In the example shown in FIG. 1B, the computing device 282 utilizes a graphics processing unit 286 and an application programming interface 288, such as Open Graphics Library (OpenGL), to process or transform the raw image data 274. In some implementations, the raw image date 274 is processed at a rate of 30-60 Hz Alternatively, the computing device 282 utilizes other processing systems, units, or applications to process or transform the raw image data 274. From the CPU 282, processed image data 276 is transmitted through a codec 292 of the robot 200 for encoding the data and to a transceiver 294, such as a radio transceiver, of the robot 200 for sending the processed/corrected image data 276, as part of the sensor data 202, to the network 120. In some implementations, the processed image data 276 includes processed forward, right, and left video feeds 276a, 276b, 276c from the corresponding forward, right, and left imaging sensors 270a, 270b, 270c. Alternatively, the raw image data 274 is not be handled be the computing device 282. Instead, the raw image data 274 is sent directly from the one or more imaging sensors 270 to the codec 292 for encoding. If the raw image data 274 is not handled by the computing device 282, then the sensor data 202 is include the raw image data 274, which would be handled after transmission through the network 120 (e.g., handled by the data processing hardware 312 of the user device 300 or the data processing hardware 112 of the remote system 110). In such examples, the imaging sensors 270 and the codec 292 are integrated into a head 260 (see FIG. 2A) of the robot 200.

FIGS. 2A-2G illustrate an example robot 200, which is capable of functioning in the system 100 of FIGS. 1A-1B. The robot 200 includes a robot body 210 (or chassis) that defines a forward drive direction F. The robot body 210 includes a base 220 and a torso 230 supported by the base 220. The base 220 includes enough weight (e.g., by supporting a power source 222, such as one or more batteries) to maintain a low center of gravity $CG_B$ of the base 220 and a low overall center of gravity $CG_R$ of the robot 200 for maintaining mechanical stability. The base 220 supports a drive system 224 (e.g., a wheeled mobility platform) configured to maneuver the robot 200 across a floor surface 135, which defines an x-y plane, while the imaging sensors 270 capture corresponding raw image data 274 (e.g., video feeds). The drive system 224, which may include a motor (not shown), may provide omni-directional and/or holonomic motion control of the robot 200. As used herein the term "omni-directional" refers to the ability to move in substantially any planar direction with three planar degrees of freedom—two translations and one rotation. These directions are generally referred to herein as x, y, and $\theta_z$, respectively. Hence, a holonomic robot has the ability to move in a planar direction at a velocity made up of substantially any proportion of the three planar velocities (forward/back, lateral, and rotational), as well as the ability to change these proportions in a substantially continuous manner. The drive system 224 is in communication with a controller system 280, which can be supported by the base 220 or any other portion of the robot body 210. The controller system 280 includes a computing device 282 (e.g., data processing hardware, such as an i5 processor with an embedded graphics processing unit 286) in communication with memory hardware 284. The controller system 280 communicates with the user device 300 and/or the remote system 110.

The torso 230 may include a sensor module 232 as described in U.S. Pat. No. 8,958,911, which is hereby incorporated by reference in its entirety. The torso 230 supports an interface module 240, which includes a neck 250 supported by the torso 230 and a head 260 supported by the neck 250. In some examples, the neck 250 provides panning and tilting of the head 260 with respect to the torso 230. In some examples, the neck 250 moves (e.g., along a linear track, telescopically, or via articulation) to alter a height of the head 260 with respect to the floor surface 135. In additional examples, the neck 250 provides a range of angular movement about the x-axis (e.g., ±90 degrees) and/or z-axis (e.g., of between about 90 degrees and about 360 degrees). Other ranges are possible as well.

The head 260 may include a screen 262 (e.g., touch screen), a speaker 264, a microphone 266, and a vision system 268 that includes one or more imaging sensors 270. The vision system 268 captures still images, video, and/or 3D volumetric point clouds from an elevated vantage point of the head 260. In the examples shown, the head 260 includes a forward imaging sensor 270a disposed on a top portion 260a of the head 260 and two peripheral awareness imaging sensors, a right imaging sensor 270b disposed on a right portion 260b of the head 260 and a left imaging sensor 270c disposed on a left portion 260c of the head 260. In some examples, the forward imaging sensor 270a is centrally disposed on the top portion 260a of the head 260 in a common vertically oriented plane with the right and left imaging sensors 270b, 270c, and the right and left imaging sensors 270b, 270c may be disposed in a common horizontal plane vertically spaced from the forward imaging sensor 270a. The left and right imaging sensors 270b, 270c are fixed cameras having no pan or tilt mechanism. The forward imaging sensor 270a is not co-located with the right and left imagining sensors 270b, 270c and the right and left imagining sensors 270b,270c are located along respective right and left sides of the head 260 so that their fields of view are not obstructed by a portion of the head 260. For example, if the right and left imaging sensors 270b, 270c were collocated at a top central portion of the head along with the forward imaging sensor 270a, they would capture the right portion and left portion of the top edge of the head 260 in their respective fields of view and therefore would be unable to fully view the peripheral environment along the left and right sides of the robot 200.

In some examples, the left and right imaging sensors 270b,270c are located along side edge portions of the head 260 of the mobile teleconferencing robot 200, such as a video screen head (e.g., a monitor or tablet), and the forward imaging sensor 270a is located along a top edge portion of the head 260 of the mobile robot 200. The left, right and forward imaging sensors 270a-c are not co-located but disposed about the periphery of the head 260 for unimpeded viewing of their respective portions of the environment around the robot 200.

In other examples, the head 260 includes one or more imaging sensors 270 disposed on any portion of the robot 200 in a variety of arrangements. For example, more than one imaging sensor 270 may be disposed on the top portion 260a of the head 260, one or more imaging sensors 270 may be disposed at the same or different heights on the right portion 260b and/or left portion 260c of the head 260 relative to the forward imaging sensor 270a. In additional examples, one or more imaging sensors are co-located at some point on the head 260 or elsewhere on the robot 200.

The forward imaging sensor 270a is disposed on the top portion 260a of head 260 at a first location to have a forward field of view (FOV) 272a aimed along the forward drive direction F of the robot 200 and configured to capture a forward video feed 274a. In some examples, the forward imaging sensor 270a is implemented as a high definition camera having a wide-angle lens 278a and optical and digital zoom features. The forward FOV 272a may have a horizontal FOV 272ah of between 90 degrees and 110 degrees (e.g., about 100 degrees) and/or a vertical FOV 272av of between 80 degrees and 90 degrees (e.g., about 90 degrees). Other fields of view are possible as well.

The right imaging sensor 270b and the left imaging sensor 270c, which may be collectively referred to as the peripheral imaging sensors, are arranged on the corresponding right and left portions 260b, 260c of the head 260 to aim in corresponding right and left directions R, L, with respect to the forward drive direction F. In the example shown, the right imaging sensor 270b is arranged on the right portion 260b of the head 260 at a second location vertically apart from the first location of the forward imaging sensor 270a to have a right field of view 272b aimed in the right direction R with respect to the forward drive direction F. The right imaging sensor 270b is configured to capture a right video feed 274b. Similarly, the left imaging sensor 270c is arranged on the left portion 260c of the head 260 at a third location vertically apart from the first location of the forward imaging sensor 270a to have a left field of view 272c aimed in the left direction L with respect to the forward drive direction F. The left imaging sensor 270c is configured to capture a left video feed 274c.

In some implementations, the right and left imaging sensors 270b, 270c each have a fish-eye lens 278b, 278c, and the right and left FOVs 272b, 272c each have a horizontal FOV 272bh, 272ch of about 180 degrees±10 degrees and a vertical FOV 272bv, 272cv of about 135 degrees±10 degrees. In additional implementations, the right imaging sensor 270b and the left imaging sensor 270c are each implemented as a high definition, wide angle camera having a fisheye lens 278b, 278c and may provide a virtual tilt feature, such that the selection of a displayed portion of the field of view of the camera changes without physically tilting or moving the camera. While the right and left horizontal FOVs 272bh, 272ch may be presented utilizing the virtual tilt feature, the robot 200 may also present a view including only a desired portion of the horizontal FOV 272bh, 272ch of the right imaging sensor 270b and/or the left imaging sensor 270c. In some implementations, the horizontal FOV 272bh, 272ch and the vertical FOV 272bv, 272cv of the right and left imaging sensors 270b, 270c are sized to each envelope/capture a hemispherical sphere of space about the robot 200, such that a combination of the FOVs 272b, 272c of the right and left imaging sensors 270b, 270c envelopes/captures a sphere of space about the robot 200.

The power source 222 may include one or more lithium-ion batteries, one or more other type of batteries, or any other power source capable of powering the components of the robot 200. The power source 222, which the robot body 210 can carry, is in electrical communication with each component of the robot 200 requiring power and delivers power as necessary to these components of the robot 200.

Figure 2D:
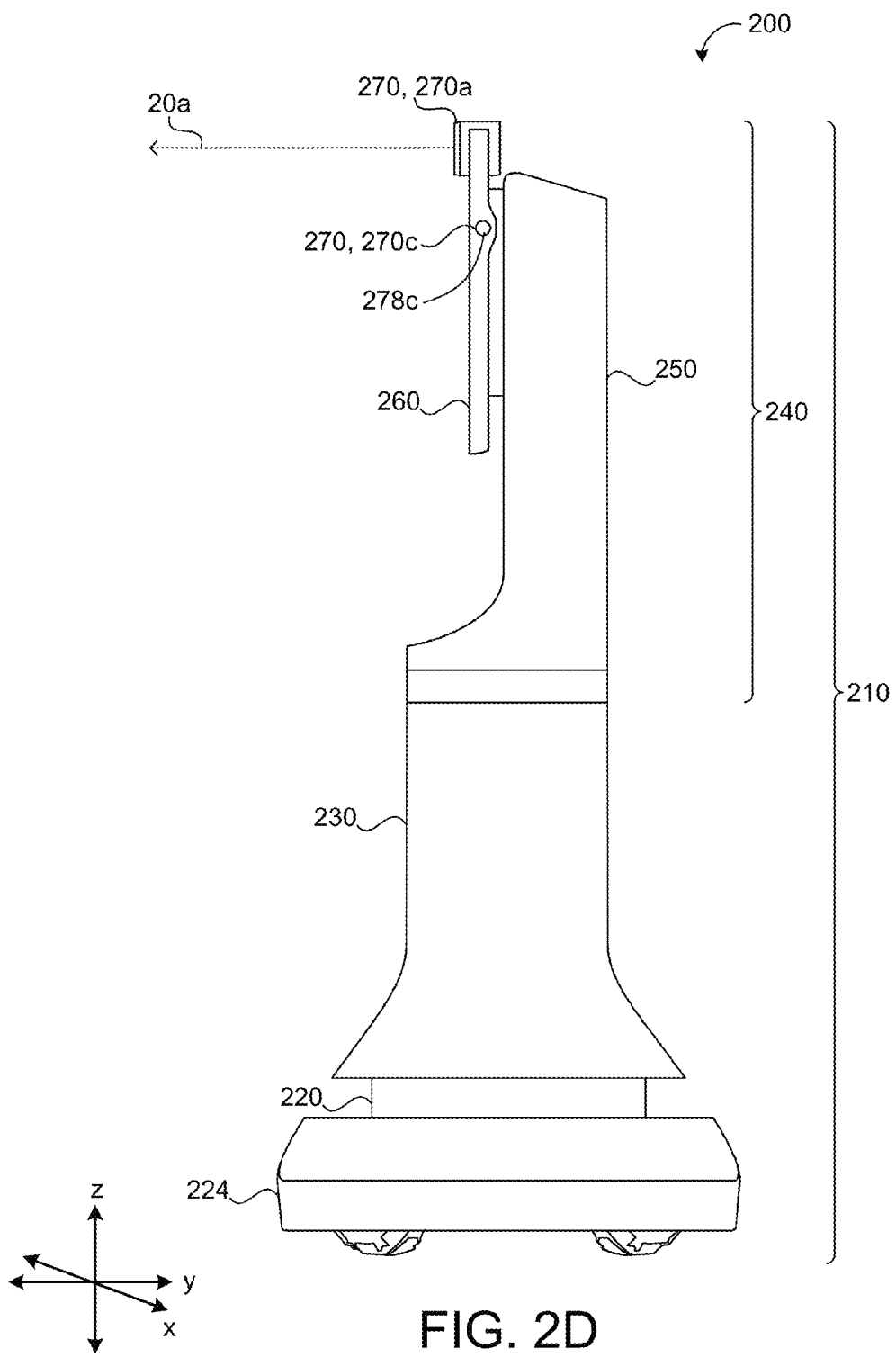
FIGS. 2D and 2E are a side views of the mobile robot of FIG. 2A having a front imaging sensor at different tilt angles.
Figure 2E:
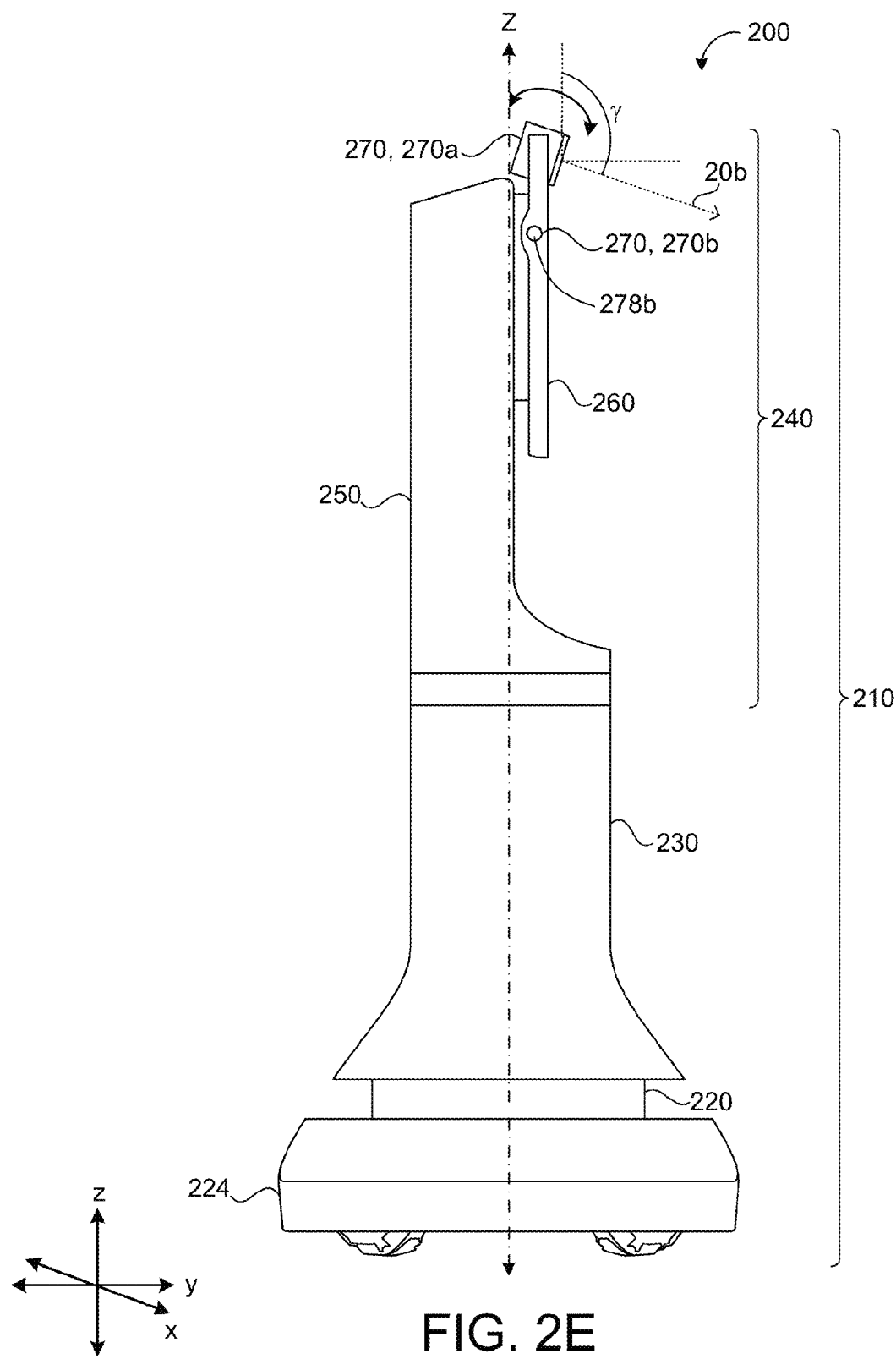

Referring specifically to FIGS. 2D and 2E, in some implementations, the forward imaging sensor 270a is attached to the top portion 260a of the head 260 of the robot 200 in a fashion that permits an actuated tilt, which is accomplished by a motor (not shown) that rotates the forward imaging sensor 270a relative to a horizon. Accordingly, the forward imaging sensor 270a mechanically tilts from a first position (as illustrated in FIG. 2D) having a horizontal view sightline 20a aimed substantially parallel to the floor surface 135 in the x-y plane to a second position (as illustrated in FIG. 2E) having a tilted view sightline 20b aimed downward toward the floor surface 135 at an angle γ from the x-y plane or a vertical axis Z of the robot 200. The range of mechanical tilt of the forward imaging sensor 270a may vary between different implementations of the robot 200. Referring specifically to FIG. 2D, in some implementations, the forward imaging sensor 270a is attached at the top portion 260a of the head 260 without mechanical tilting capabilities. In some implementations, the vertical FOV 272av of the forward imaging sensor 270a has sufficient range such that mechanical tilting of the forward imaging sensor 270a is not be necessary to provide an immersive video experience. The forward imaging sensor 270a has a virtual tilt feature such that the forward imaging sensor 270a digitally tilts the vertical FOV 272av without mechanically moving the imaging sensor 270a from the horizontal view sightline 20a. In some examples, the forward imaging sensor 270a implements the digital tilting by returning a forward video feed 274a corresponding to a portion or a sub-window of the FOV 272a. As the forward imaging sensor 270a digitally tilts downward, the forward video feed 274a includes more of a lower portion of the vertical FOVav of the forward imaging sensor 270a. Similarly, as the forward imaging sensor 270a digitally tilts upward, the forward video feed 274a includes more of an upper portion of the vertical FOVav of the forward imaging sensor 270a.

Figure 2F:
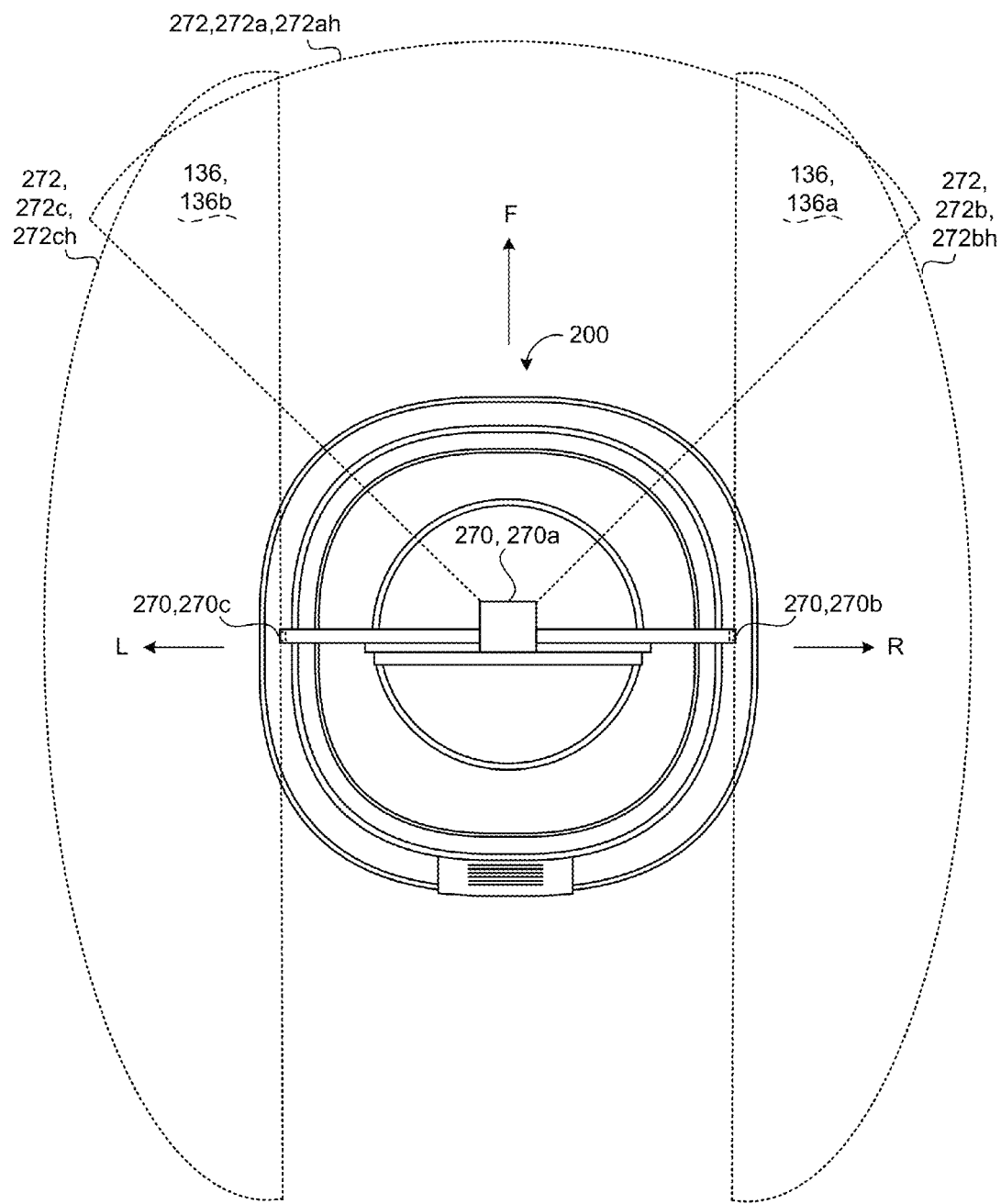
FIG. 2F is a top view of the mobile robot of FIG. 2A showing example fields of view of imaging sensors on the mobile robot.
Figure 2G:
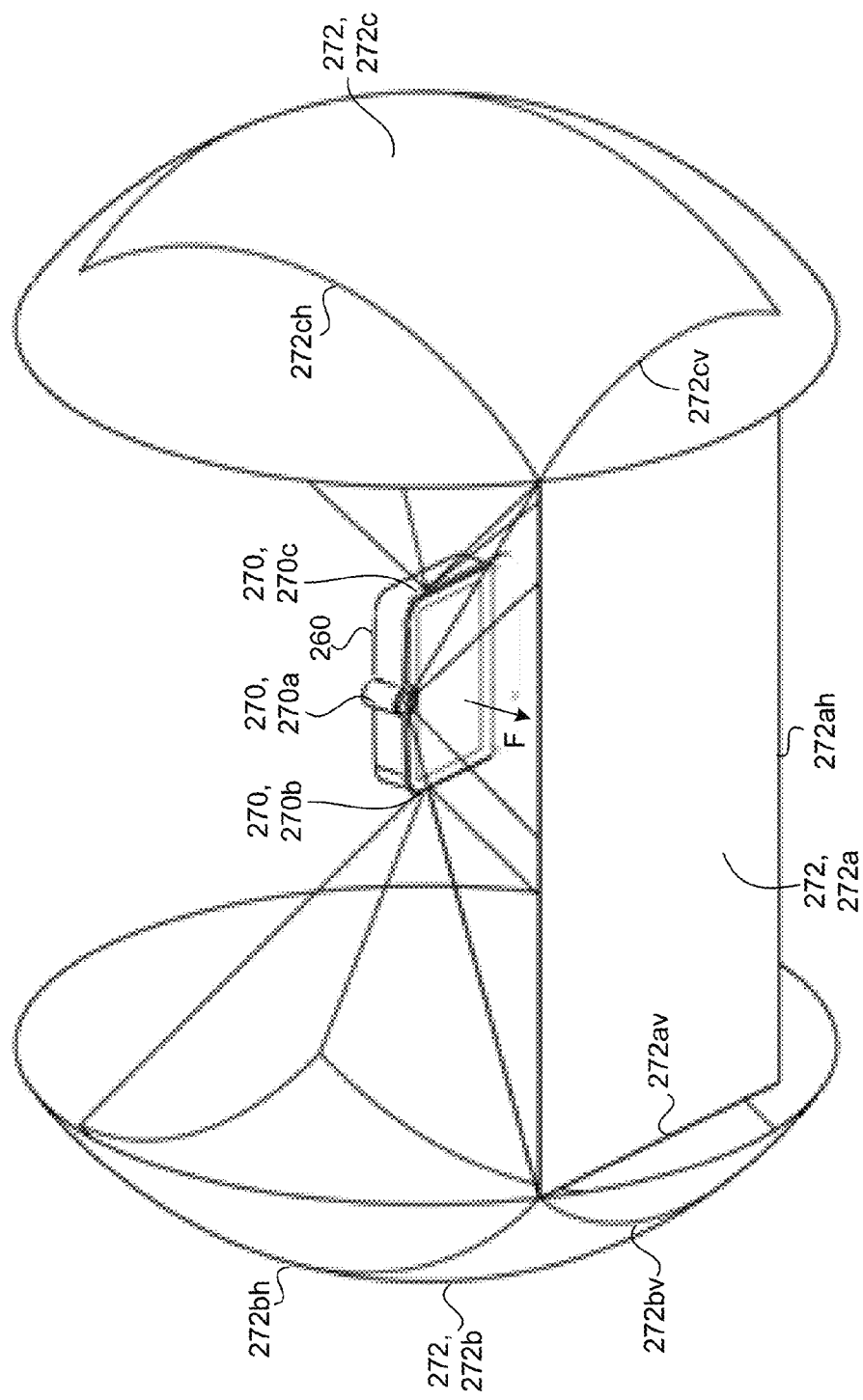
FIG. 2G is a perspective view of the field of view of each imaging sensor of the robot of FIG. 2A.

FIGS. 2F and 2G illustrate an implementation of the robot 200 having the forward imaging sensor 270a aimed to have the forward FOV 272a along the forward drive direction F and two peripheral imaging sensors, the right imaging sensor 270b and the left imaging sensor 270c, facing substantially perpendicular to the forward imaging sensor 270a in corresponding right and left directions R, L with their corresponding FOVs 272b, 272c aimed in opposite directions. The separate locations of the imaging sensors 270, 270a-c result in the corresponding FOVs 272, 272a-c forming one or more overlapping zones 136, 136a, 136b. In the example shown, the forward imaging sensor 270a has a substantially 90-degree horizontal FOV 272ah and each peripheral imaging sensor 270b, 270c has a substantially 180-degree horizontal FOV 272bh, 272ch, resulting in right and left overlapping zones 136a, 136b. The FOV 272a of the forward imaging sensor 270a and the FOV 272b of the right imaging sensor 270b overlap in a right overlap zone 136a. The FOV 272a of the forward imaging sensor 270a and the FOV 272c of the left imaging sensor 270c overlap in a left overlap zone 136b.

Figure 2H:
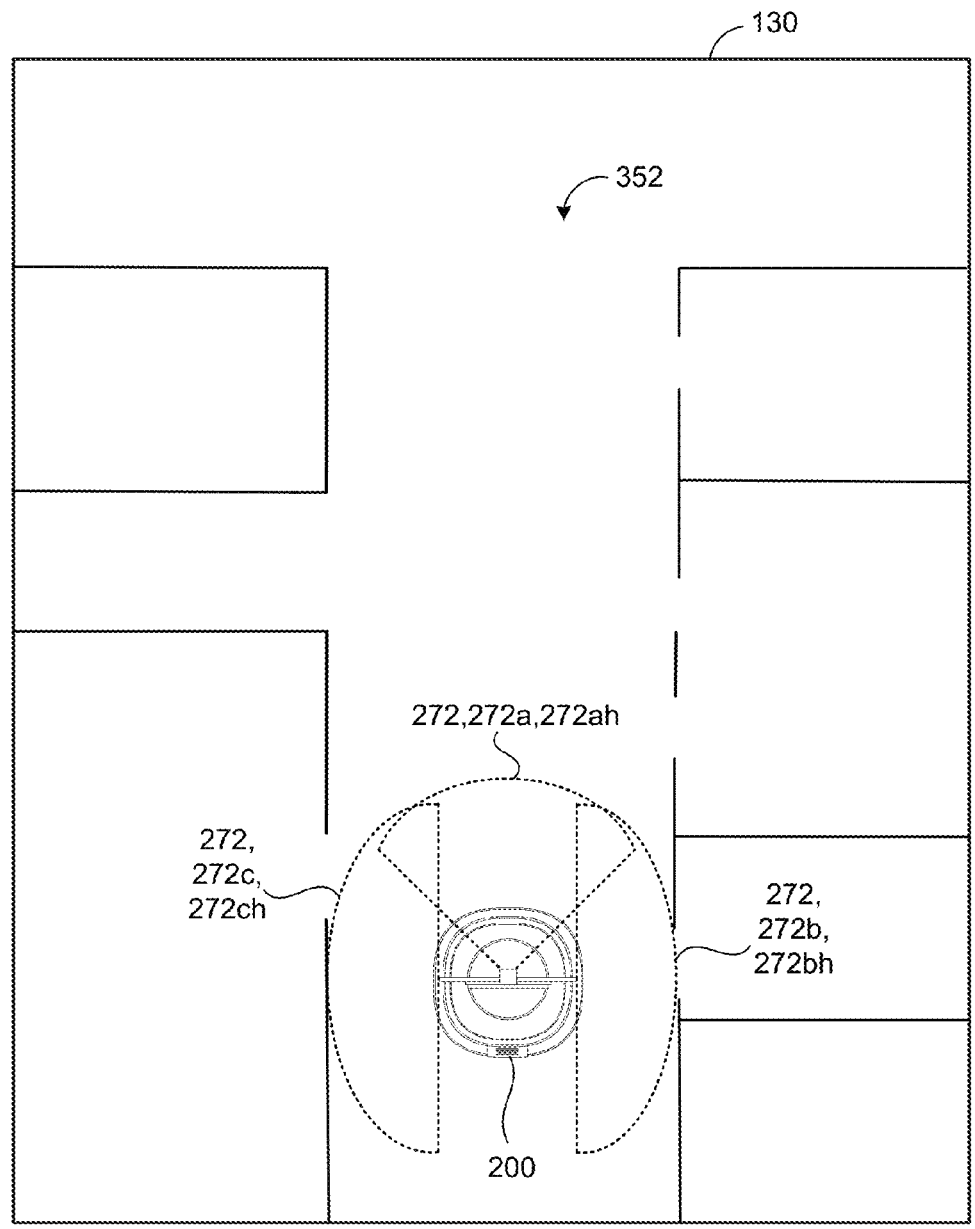
FIG. 2H is a top view of the mobile robot of FIG. 2A located at a premise.
Figure 21:
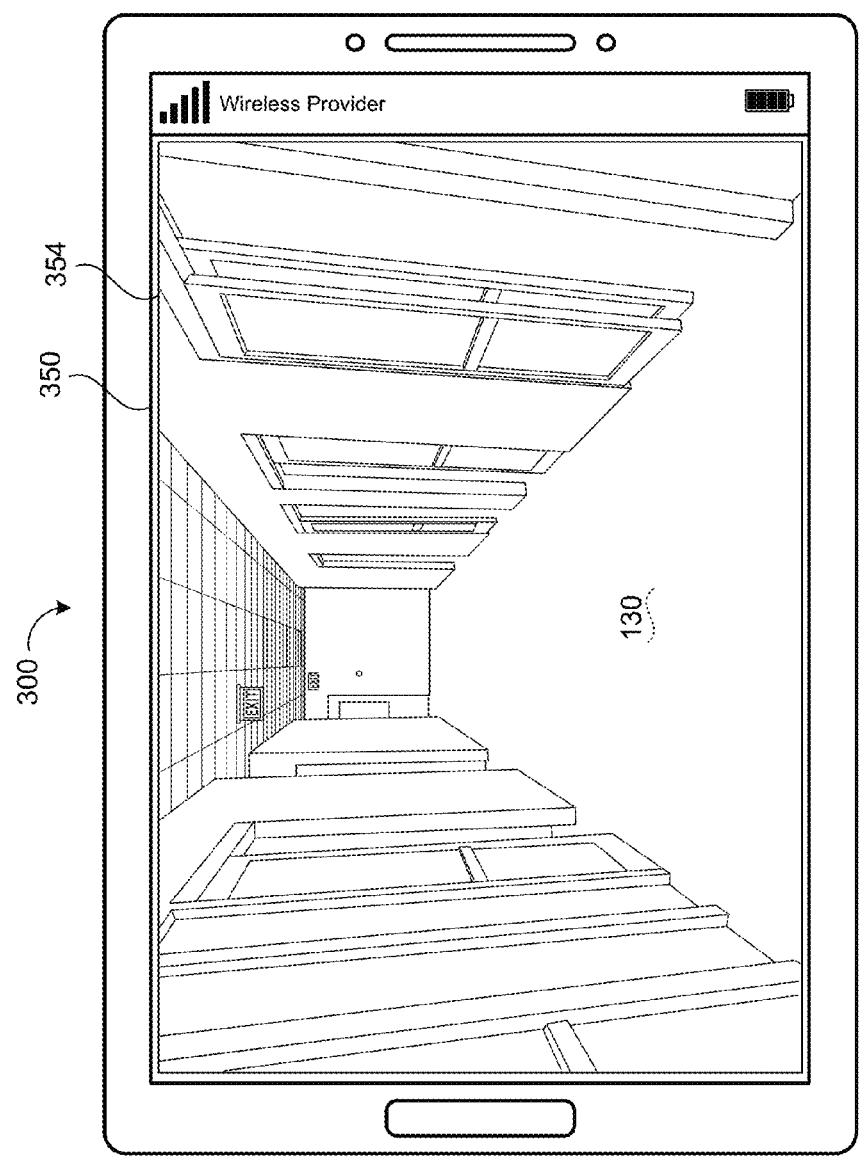

FIG. 2H illustrates the robot 200 capturing images/video feeds while maneuvering about a premise 130. The FOVs 272a-c of the imaging sensors 270a-c define a viewing area 352 of the premise 130 at which the robot 200 is located. Raw image data 274 originating from the imaging sensors 270, 270a-c may include any portion or all of the viewing area 352. Such raw image data 274, which includes video data, may be processed by the robot 200 and/or transmitted to a user device 300 and/or a remote system 110, as discussed previously and illustrated in FIGS. 1A-1B. Turning to FIG. 2I, any portion or all of the viewing area 352 of the premise 130 may appear in a remote view 354 on the screen 350 of the user device 300. The remote view 354 on the screen 350 may originate from one imaging sensor 270 or may present a portion of the viewing area 352 originating from more than one imaging sensor 270, 270a-c, as described hereinafter.

Other sensors associated with the sensor module 232 (e.g., presence sensors) of the robot 200 may provide a non-image awareness both within and outside of the viewing area 352. The raw image data 274 from the imaging sensors 270, 270a-c, along with the data from other sensors of the sensor module 232, becomes part of the sensor data 202 (as illustrated on FIG. 1B) and may enable the user device 300 to present the remote view 354 of the premise 130 to the remote user 10 and/or the robot 200 to perform tasks. For example, as described in U.S. Pat. No. 8,958,911 (which is incorporated herein by reference in its entirety), the sensor data 202 from both the imaging sensors 270, 270a-c and the other sensors of the sensor module 232 may be utilized for simultaneous localization and mapping (SLAM), object detection and obstacle avoidance (ODOA), other navigation features, and other autonomous operations of the robot 200. The controller system 280 may process the sensor data 202 for such utilization locally at the robot 200 or transmit the sensor data 202 to an external source, such as the user device 300 or the remote system 110 (as illustrated in FIG. 1B), which can utilize the sensor data 202 for such robot 200 operations. For example, the robot 200 transmits the sensor data 202 (from the imaging sensors 270 and/or the sensor module 232 sensors) to a cloud environment 110, which processes the sensor data 202, generates a usable map (via SLAM), and sends the map to the robot 200. When image data from the imaging sensors 270 is included in the sensor data 202 that is utilized for such purposes, either the raw image data 274 or image data processed by the computing device 282 of the controller system 280 of the robot 200 (for example, the corrected image data 276 shown in FIG. 4C) may be utilized by the cloud environment 110.

In some implementations, altering a viewing state of the vision system 268 by adjusting the tilt angle γ of the forward imaging sensor 270a with respect to the vertical axis Z of the robot 200 (as shown in FIG. 2E) and/or the zoom level of the forward imaging sensor 270a based on a remote user input (e.g., a command 204) causes the controller system 280 and/or the user device 300 to generate the remote view 354 as a combined video feed that provides an immersive peripheral view about the robot 200 by combining the forward video feed 274a, 276a with a portion of the right video feed 274b, 276b and a portion of the left video feed 274c, 276c.

Figure 3A:
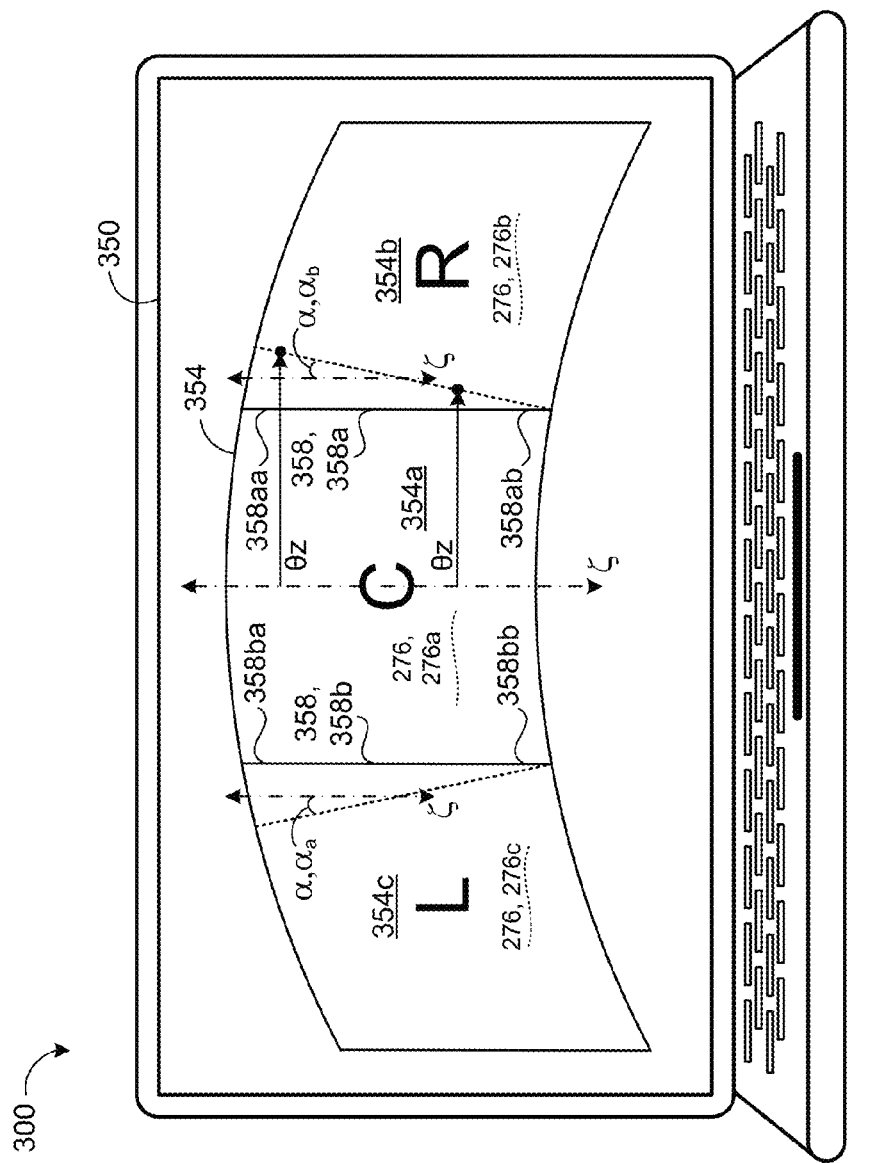
FIG. 3A is a front view of an example user device with a remote view of images/video feeds from the mobile robot of FIG. 2A displayed on a screen.

Referring to FIG. 3A, the user device 300 may be in communication with and receive the sensor data 202 transmitted from the robot 200. In some implementations, the remote view 354 on the screen 350 of the user device 300 includes a center portion 354a, a right portion 354b, and a left portion 354c arranged adjacently. The center portion 354a of the remote view 354 displays the processed/corrected real-time video feed 276a originating from the forward imaging sensor 270a of the robot 200. The right portion 354b of the remote view 354 displays the processed/corrected real-time video image feed 276b originating from the right imaging sensor 270b of the robot 200. The left portion 354c of the remote view 354 displays the processed/corrected real-time video image feed 276c originating from the left imaging sensor 270c of the robot 200. Break lines 358 (also referred to as video feed dividers) indicate a transition on the screen 350 from one portion 354a-c of the remote view 354 to another portion 354a-c of the remote view 354. Specifically, a first break line 358a indicates the transition from the center portion 354a to the right portion 354b, and a second break line 358b indicates the transition from the center portion 354a to the left portion 354c. For example, the combined video feed 354 (remote view) includes a first video feed divider 358a between the processed forward video feed 276a and a portion of the processed right video feed 358b, and a second video feed divider 358b between a portion of the processed left video feed 276c. Each video feed divider 358, 358a-b has a corresponding position and a lean angle α, $α_a$, $α_b$ with respect to a vertical viewing axis ζ based on the altered viewing state of the vision system 268. In other examples, such as those shown in FIG. 8B and FIG. 12, the remote view 354 is shaped differently than what is shown in FIG. 3A (e.g., the remote views 354 illustrated in FIG. 7A-7D), the remote view 354 appears on a larger portion, a smaller portion, or an otherwise different portion of the screen 350, the remote view 354 includes fewer than three portions 354a-c, the remote view 354 includes more than three portions 354a-c, the portions 354a-c of the remote view 354 are not be adjacently aligned (e.g., a space may separate the portions 354a-c of the remote view 354 or the remote view 354 is configured as a picture-in-picture (PiP) view), or the video feed dividers 358 are hidden to present a seamless transition between the portions 354a-c of the remote view 354.

With continued reference to FIG. 3A, in some implementations, the lean angle α, $α_a$, $α_b$ of each video feed divider 358, 358a-b is based on the tilt angle γ of the forward imaging sensor 270a. When the forward imaging sensor 270a is tilted upward away from the ground surface 135, the video feed dividers 358, 358a-b lean toward each other, and top ends 358aa, 358ba of the video feed dividers 358, 358a-b are closer to each other than bottom ends 358ab, 358bb of the video feed dividers 358, 358a-b. Moreover, when the forward imaging sensor 270a is tilted downward toward the ground surface 135, the video feed dividers 358, 358a-b lean away from each other, and the top ends 358aa, 358ba of the video feed dividers 358a, 358b are further apart from each other than the bottom ends 358ab, 358bb of the video feed dividers 358, 358a-b. In some implementations, the lean angle of each video feed divider 358 correlates to a single rotational degree measurement by which the robot 200 turns to face a selected element within either the right portion 354b or the left portion 345c of the remote view 354. In other words, regardless of where the user 10 clicks in either the right portion 354b or the left portion 354c to turn the robot 200 to face the element with the forward imaging sensor 270a, the lean angle α remains the same for an unchanged tilt angle γ of the forward imaging sensor 270a. In other words, all points along the lines of the video dividers 358 are the same pan degree θz away from the forward view. The lean angle α of the divider lines 358 therefore corresponds to the tilted position of a longitude line on the hemisphere of each fish eye lens 278b-c of the right and left imaging sensors 270b-c taken at a latitude position corresponding to the tilt angle γ of the forward imaging sensor 270a.

Figure 7A:
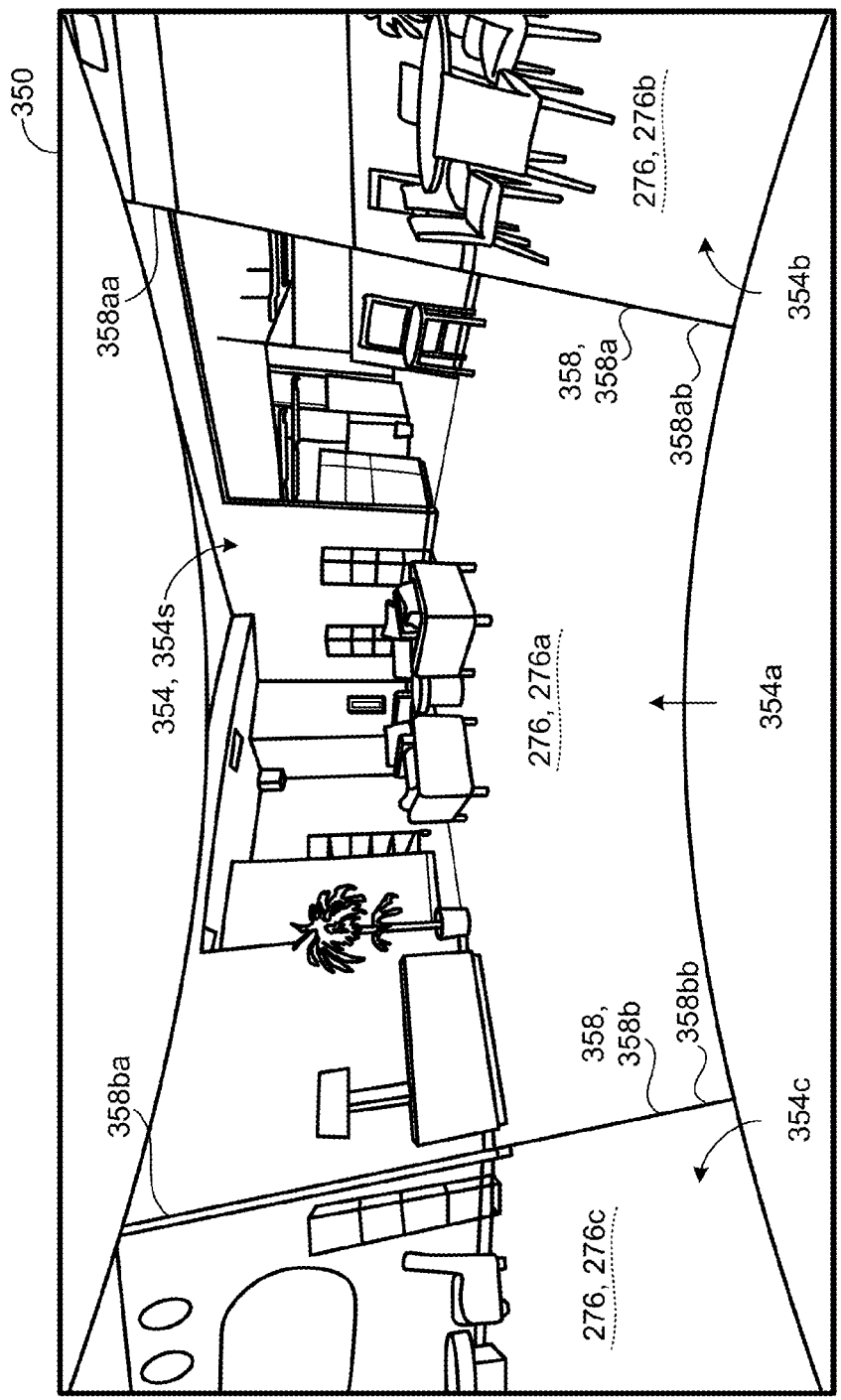
FIG. 7A is a front view of the screen of the user device of FIG. 3A displaying a remote view of overlaid corrected video feeds.

In additional implementations, the lateral position of each video feed divider 358, 358a-b across the combined video feed 354 is based on the zoom level of the forward imaging sensor 270a. When the forward imaging sensor 270a is at a zoomed-in focal range, the video feed dividers 358, 358a-b are further apart from each other than when the forward imaging sensor 270a is at a zoomed-out focal range and less of each peripheral video feed 276b-c is displayed. Different portions of the FOVs 272, 272a-c of each imaging sensor 270, 270a-c (ranging from the full horizontal FOV 272ah-ch to a small portion of the horizontal field of view 272ah-ch) may be presented in the portions 354a-c of the remote view 354, as illustrated in FIGS. 7A and 7C. For example, FIG. 7A illustrates a combined video feed 354, 354zi corresponding to a zoomed-in focal range, where the right and left video feeds 276b-c display smaller portions of the FOVs 272b-c of the right and left imaging sensor 270b-c; and FIG. 7C illustrates a combined video feed 354, 354zo corresponding to a zoomed-out focal range, where the right and left video feeds 276b-c display larger portions of the FOVs 272b-c of the right and left imaging sensor 270b-c. In some instances, the remote view 354 includes less than three portions 354a-c. The remote view 354 may include two portions 354a-c corresponding to any two of the three imaging sensors 270, 270a-c or one portion 354a-c corresponding to a single one of the three imaging sensors 270, 270a-c. For example, when the vision system 268 is fully zoomed in, the combined video feed 354 includes only the forward video feed 276a. Additionally, if the robot 200 transmitting images to the user device 300 includes more than or less than three imaging sensors 270, the remote view 354 includes portions 354a-c that corresponds to any or all of the more than or less than three imaging sensors 270.

Figure 3B:
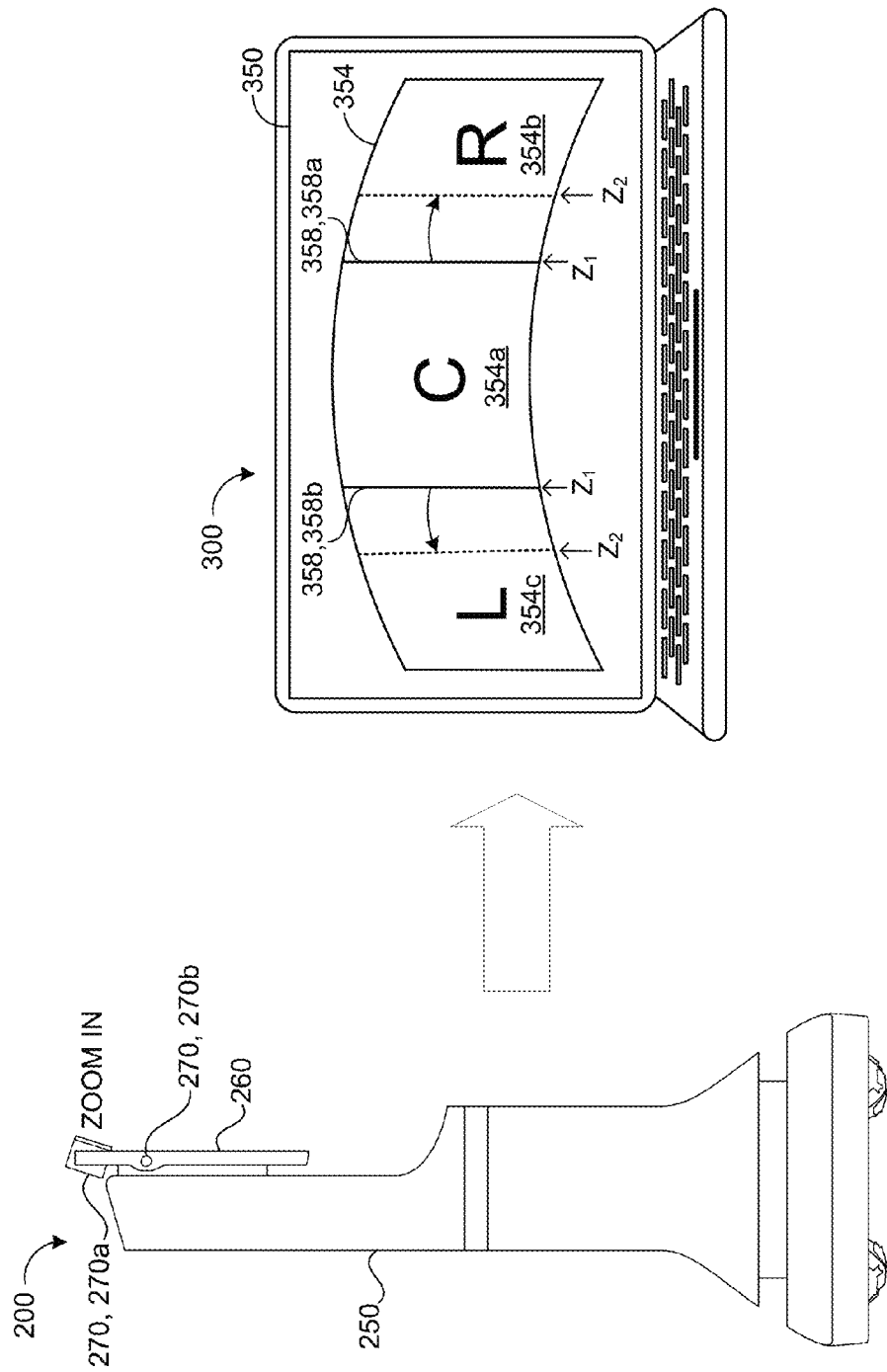
FIGS. 3B and 3C are functional diagrams illustrating features of the mobile robot of FIG. 2A and a remote view on the screen of the user device of FIG. 3A.

The portion of the FOV 272, 272a-c of the imaging sensors 270, 270a-c displayed in the remote view 354 may vary with time. In some examples, the robot 200 receives a zoom-in instruction—which originates from an application of the computing device 282 of the controller system 280 of the robot 200 or is relayed to the robot 200 as a command 204 (for example, from the user 10, from an application 330 of the user device 300, or from the remote system 110). Upon receiving such a zoom-in instruction, the computing device 282 of the controller system 280 of the robot 200 changes, in time, the sensor data 202 transmitted to the user device 300, such that the remote view 354 on the screen 350 increases in size magnification, but decreases an area of view. As illustrated in FIG. 3B, the remote view 354 may zoom in from a first zoomed level $Z_1$ to a second zoomed level $Z_2$. At the second zoomed level $Z_2$, the center portion 354a of the remote view 354 corresponding to the processed video feed 276a from the forward imaging sensor 270a enlarges while the right portion 354b and the left portion 354c of the remote view 354 decrease in size. The full horizontal field of view 272ah of the forward imaging sensor 270a is included in the center portion 354a of the remote view 354 at both the first zoomed level $Z_1$ and the second zoomed level $Z_2$, with the full horizontal field of view 272ah magnified in the second zoomed level $Z_2$. However, the portion of the right field of view 272b from the right imaging sensor 270b included in the right portion 354b of the remote view 354 and the portion of the left field of view 272c from the left imaging sensor 270c included in the left portion 354c of the remote view 354 both decrease in the second zoomed level $Z_2$ to accommodate the size increase of the center portion 354a of the remote view 354. In other words, the left and right FOVs 272b-c are truncated in the horizontal direction to show only portions of the left and right FOVs 272b-c closest to the forward drive direction F of the robot 200. Similarly, a zoom-out instruction causes a decrease in the size of the center portion 354a of the remote view 354, which results in an increase in the portion of the right field of view 272b from the right imaging sensor 270b that is included in an enlarged right portion 354b of the remote view 354 and an increase in the portion of the left field of view 272c from the left imaging sensor 270c that is included in an enlarged left portion 354c of the remote view 354. In other words, the left and right FOVs 272b-c are expanded in the horizontal direction to show larger portions of the left and right FOVs 272b-c closest to the forward drive direction F of the robot 200. In some implementations, the lean angle of each video feed divider 358 correlates to a single rotational degree measurement by which the robot 200 turns to face a selected element within either the right portion 354b or the left portion 345c of the remote view 354. In other words, regardless of where the user 10 clicks in either the right portion 354b or the left portion 354c to turn the robot 200 to face the element with the forward imaging sensor 270a, the lean angle α remains the same for an unchanged tilt angle γ of the forward imaging sensor 270a.

In some implementations, the forward imaging sensor 270a utilizes a digital zoom feature to magnify the image data 274a without varying the horizontal field of view 272ah. However, the forward imaging sensor 270a may also include an optical zoom feature, i.e., an ability to shorten or lengthen an associated focal length, which may be utilized to zoom in or zoom out, to alter the horizontal field of view 272ah. In addition to the robot 200 receiving the zoom instruction and altering the remote view 354 at its computing device 282, the robot 200 transmits raw image data 274, 274a-c from each of the imaging sensors 270 of the robot 200 to the network 120, and either the data processing hardware 312 of the user device 300 or the data processing hardware 112 of the remote system 110 operates a zoom feature to alter the remote view 354.

Figure 3C:
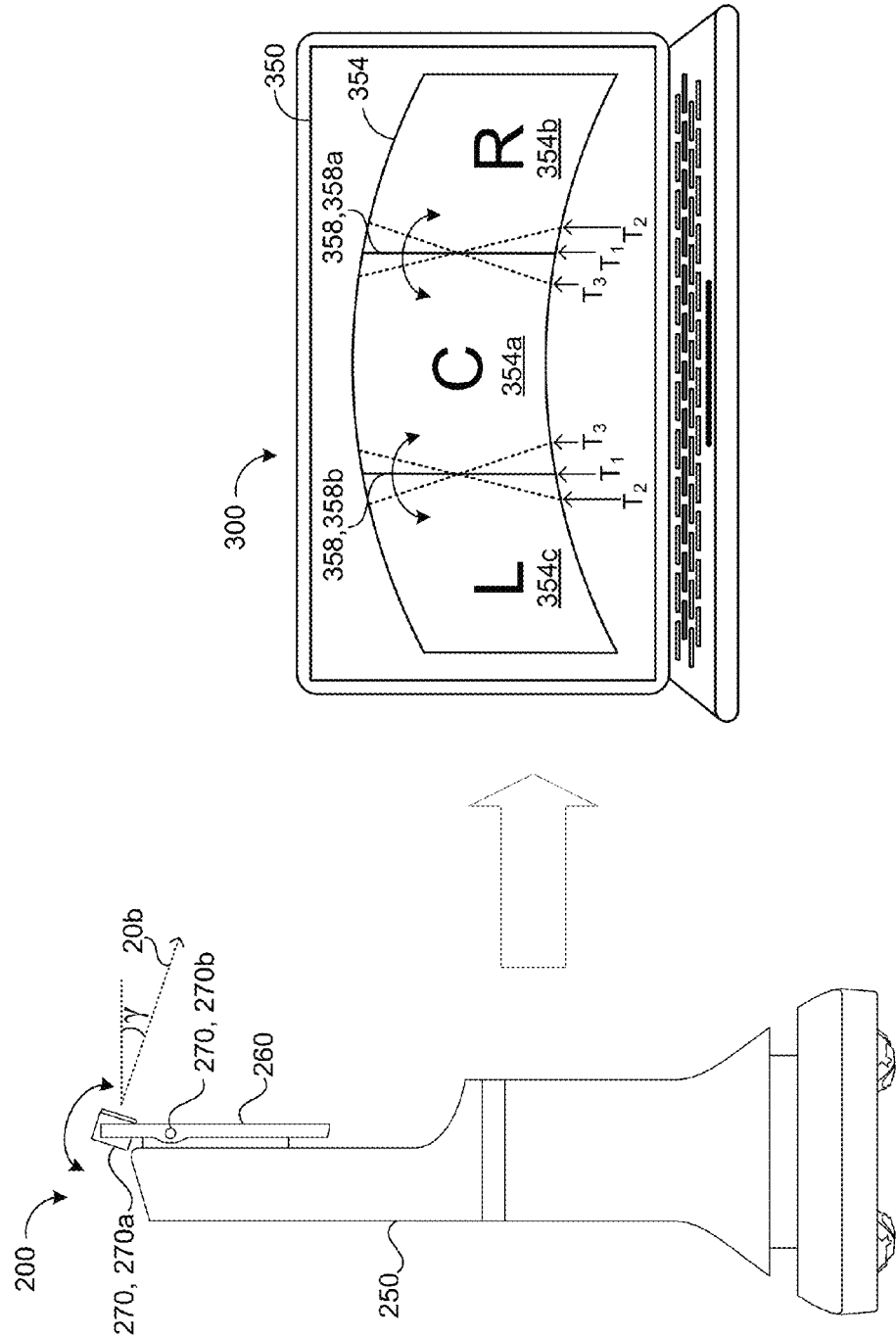

As illustrated in FIG. 3C, in response to a tilt command 204, the remote view 354 on the screen 350 of the user device 300 changes in time with respect to a vertical viewing angle to display a tiled forward video feed 276a in the remote view 354. The robot 200 is configured to receive a tilt instruction, which originates from an application of the computing device 282 of the controller system 280 of the robot 200 or is relayed to the robot 200 as a command 204 from the user 10 via an application 330 of the user device 300. Upon receiving such a tilt instruction, the controller system 280 effectuates a mechanical tilt of the forward imaging sensor 270a (e.g., by actuation of a motor). As a change in tilt angle γ of the forward imaging sensor 270a occurs, the computing device 282 of the controller system 280 of the robot 200 changes the sensor data 202 transmitted to the user device 300, such that the relationship between the portions—for example, the center portion 354a, the right portion 354b, and the left portion 354c—of the remote view 354 on the screen 350 varies to match the tilt angle γ of the main imaging sensor 270a. As the forward imaging sensor 270a mechanically tilts upward, the break lines 358 at the edges of the center portion 354a of the remote view 354 rotate or lean to correspond with the tilt of forward imaging sensor 270a, moving in the remote view 354 from a first alignment $T_1$ to a second alignment $T_2$. As the forward imaging sensor 270a mechanically tilts downward, the break lines 358 at the edges of the center portion 354a of the remote view 354 rotate or lean to correspond with the tilt of the forward imaging sensor 270a, moving in the remote view 354 from a first alignment $T_1$ to a third alignment $T_3$.

When generating the remote view 354 (a combined video feed), the computing device 282 selects a portion of the right video feed 276b and a portion of the left video feed 276c based on at least one of the tilt angle γ of the forward imaging sensor 270a, the zoom level of the forward imaging sensor 270a, or an offset of the vertical FOV 272av of the forward imaging sensor 270a relative to the FOV 272b, 272c of the right imaging sensor 270b and/or the left imaging sensor 270c relative to a viewing horizon. The computing device 282 scales the right video feed 276b and the left video feed 276c to each have a similar scale of the forward video feed 276a and arrange the portion of the right video feed 276b and the portion of the left video feed 276c relative to the forward video feed 270a (to form the remote view 354). In some implementations, the computing device 282 corrects distortion (e.g., wide angle distortion), matches colors, blends, and/or scales the raw video feeds 274a-c, such that the combined video feed 354 has a unified appearance much like human perception of color and size gradients across the peripheral and forward FOVs 272a-c. This may be done before the selection and arrangement of the processed video feeds 276a-c.

Figure 4A:
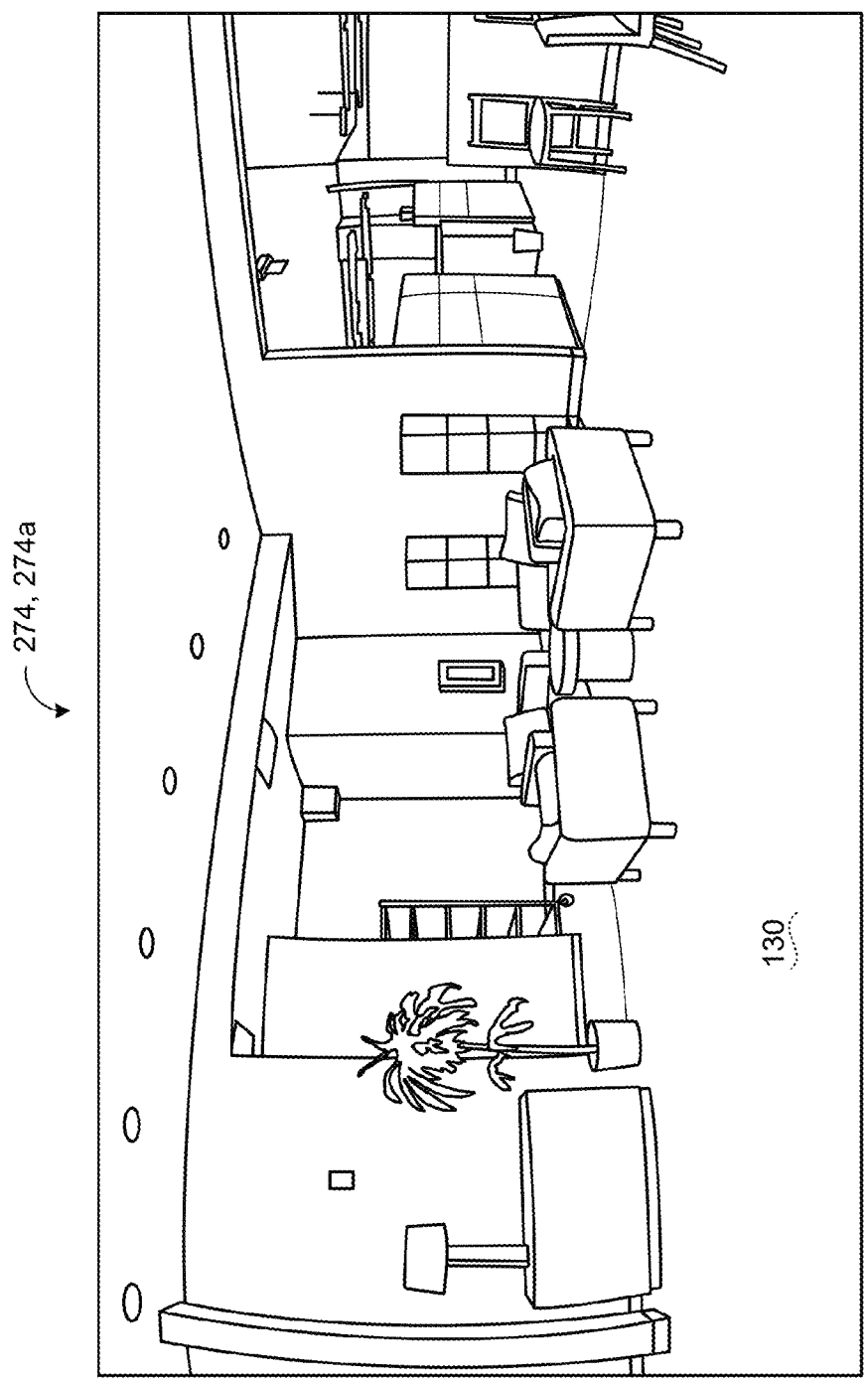
FIG. 4A is a plan view of a raw image from a forward imaging sensor of the mobile robot of FIG. 2A.
Figure 4B:
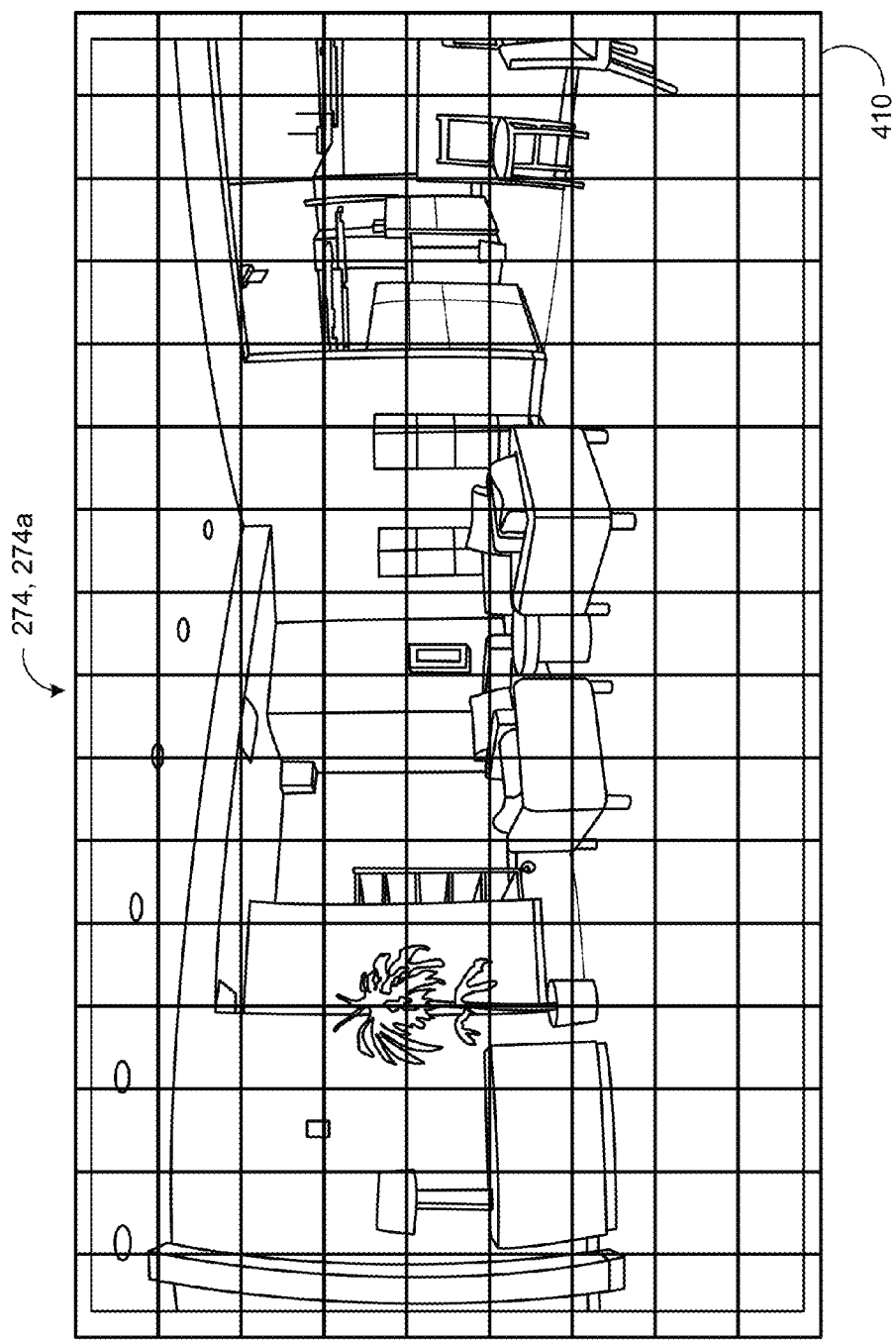
FIG. 4B is a view of the raw image of FIG. 4A overlaid with a calibration grid.
Figure 4C:
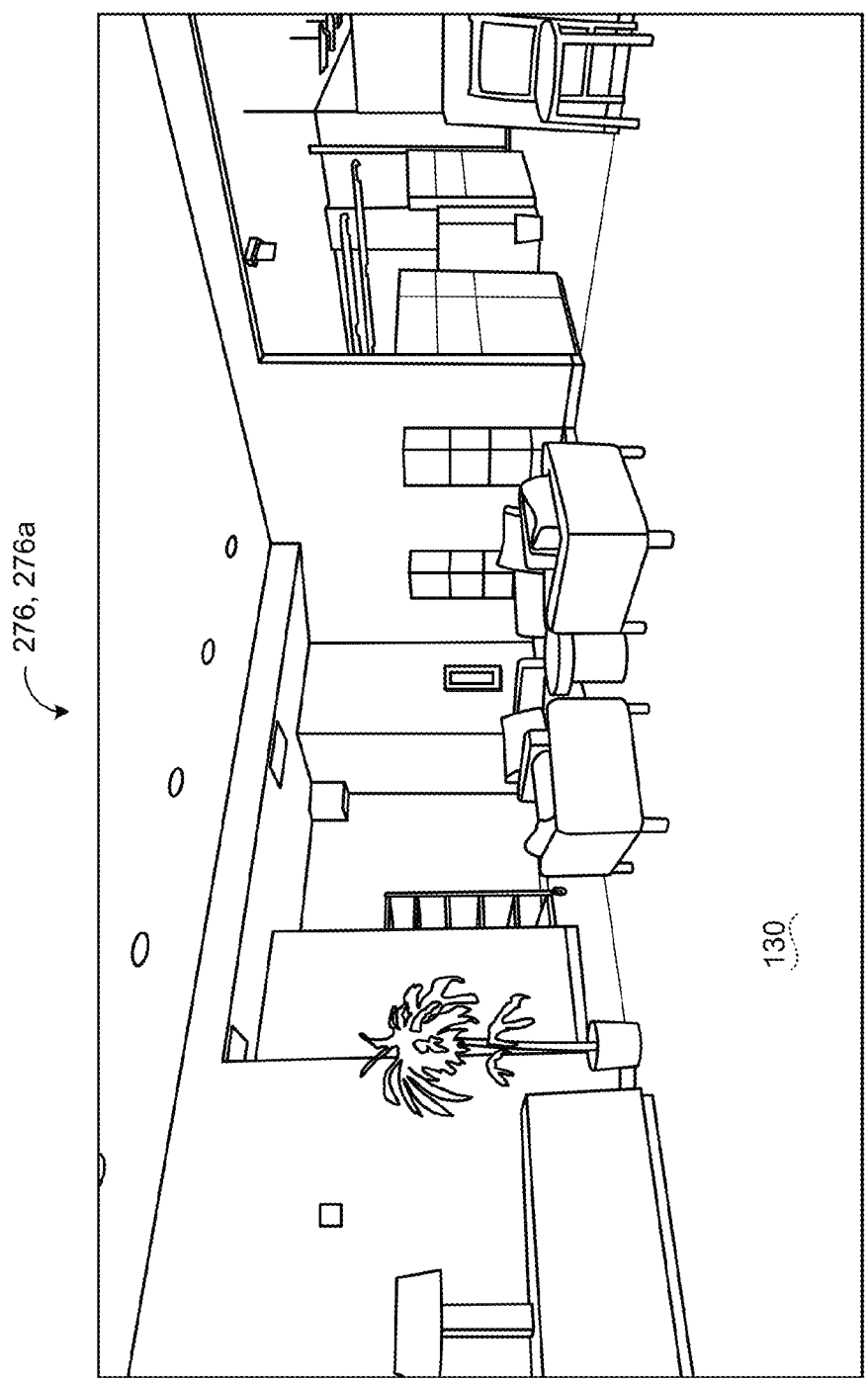
FIG. 4C is a plan view of a corrected video feed resulting from calibration and/or distortion correction of the raw image of FIG. 4A.

FIG. 4A presents a sample raw video feed 274 (or image) that collected from one of the imaging sensors 270. In some implementations, the forward imaging sensor 270a of the robot 200 collects a raw video feed 274a that is distorted, such as the barrel distorted raw video feed 274a shown in FIG. 4A. Due to the use of a wide-angle lens 278a of the forward imaging sensor 270a (providing a wide horizontal field of view 272ah as described previously and illustrated in FIG. 2G), the raw video feed 274a of the premise 130 as shown in FIG. 4A is noticeably distorted. The graphics processing unit 286 embedded in the computing device 282 of the robot 200 corrects the distortion of the raw video feed 274a in real time. FIG. 4B illustrates a calibration grid 410 overlaid on the raw video feed 274a. The calibration grid 410, as discussed hereinafter, enables image calibration (i.e., distortion correction). FIG. 4C presents a sample corrected video feed 276, 276a of a portion of the premise 130 following calibration/correction of the raw video feed 274a collected by the forward imaging sensor 270a. The corrected image/video feed 276, 276a is dewarped and appears equal to a human perception of the same scene.

Figure 4D:
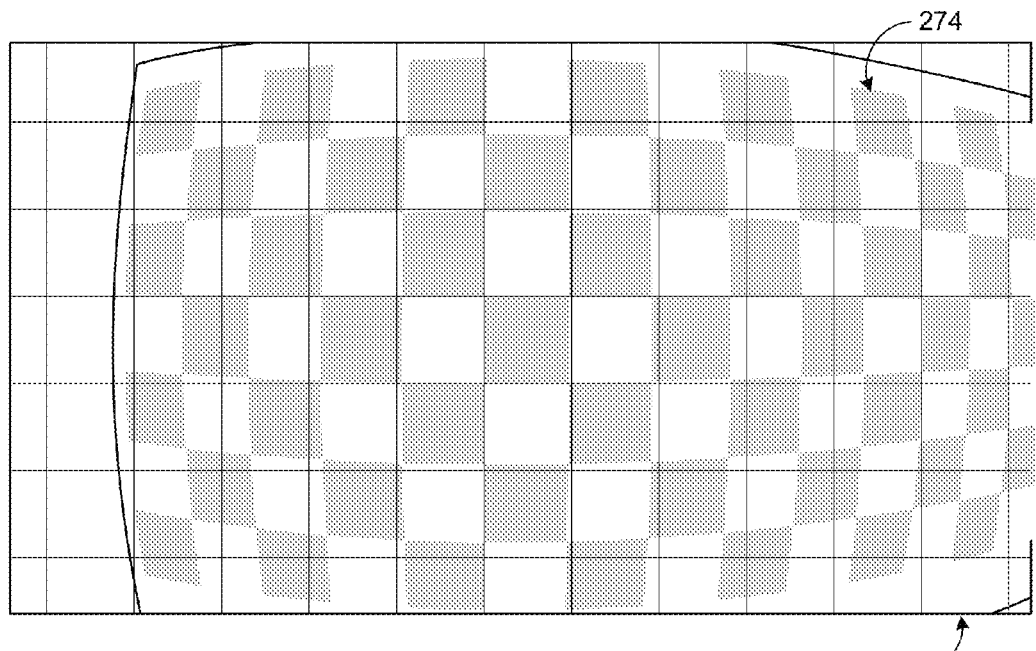
FIGS. 4D and 4E are schematic views illustrating calibration correction of a raw image.
Figure 4E:
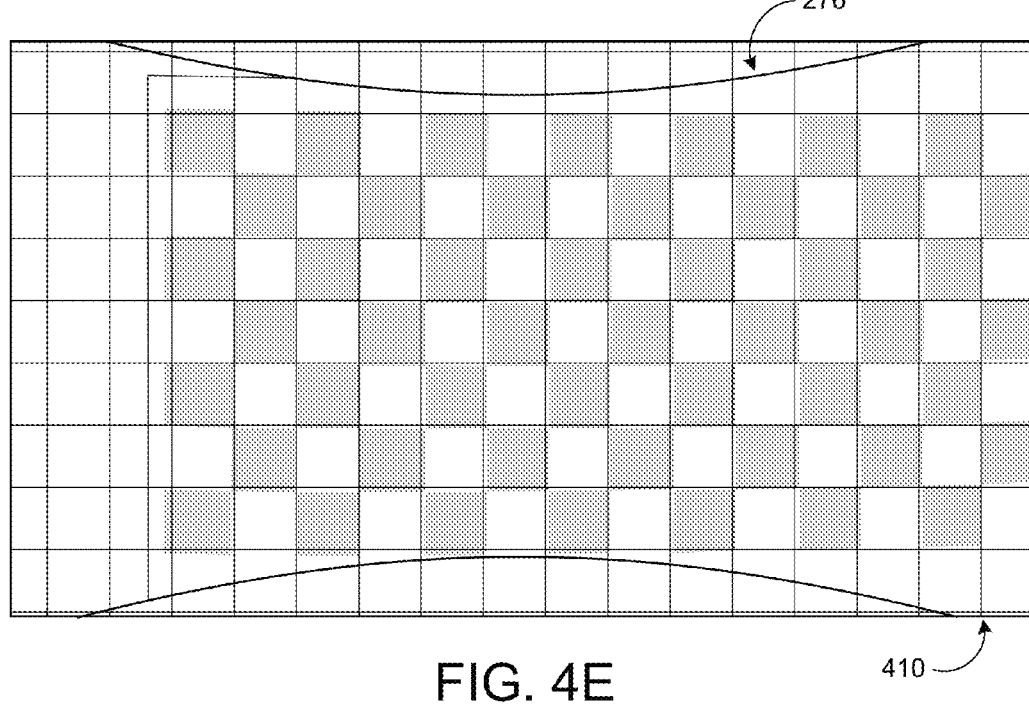

In some implementations, the computing device 282 of the robot 200 includes a graphics processing unit 286 and software configured to perform image calibration for distortion correction of the raw video feeds 274 originating from the imaging sensors 270. Thus, the sensor data 202 transmitted from the robot 200 (as illustrated in FIG. 1B) includes processed/corrected video image data 276 transferred in real-time from the mobile teleconferencing robot 200 while moving and stationary. In other implementations, however, the robot 200 transmits sensor data 202 including the raw image data 274 for calibration elsewhere (e.g., at the remote system 110 or the user device 300). Referring to FIGS. 4D and 4E, the computing device 282 of the robot 200 performs image calibration utilizing the calibration grid 410 to transform the raw video feed 274 to a corrected video feed 276. FIG. 4D illustrates a calibration grid 410 overlaid onto a raw image 274 having a barrel-distorted checkered pattern. The computing device 282 fits the checkered pattern of the raw image 274 to the calibration grid 410, as shown in FIG. 4E, in order to calibrate the raw image 274 for distortion correction. The corrected image/video feed 276, which has a varying height across the image/video feed 276, results from the calibration. The distortion correction may be accomplished by identifying lens correction parameters for correcting barrel distortion caused by the lens of the imaging sensor 270. The computing device 282 uses the correction parameters to accomplish a polynomial-based correction. In some examples, the graphics processing unit 286 of the computing device 282 of the robot 200 utilizes this method and corrects the barrel distortion in real time. In some examples, the corrected image/video feed 276 does not define a 16:9 aspect ratio image. Accordingly, the computing device 282 further crops the calibrated image/video feed 276 in order to size the final corrected image/video feed 276 at a 16:9 aspect (W:H) ratio as illustrated in FIG. 4E. In other examples, without deviating from the scope of this disclosure, the computing device 282 crops the calibrated image to a different aspect ratio (e.g., 4:3 or any other size) to form the corrected image/video feed 276.

Figure 5A:
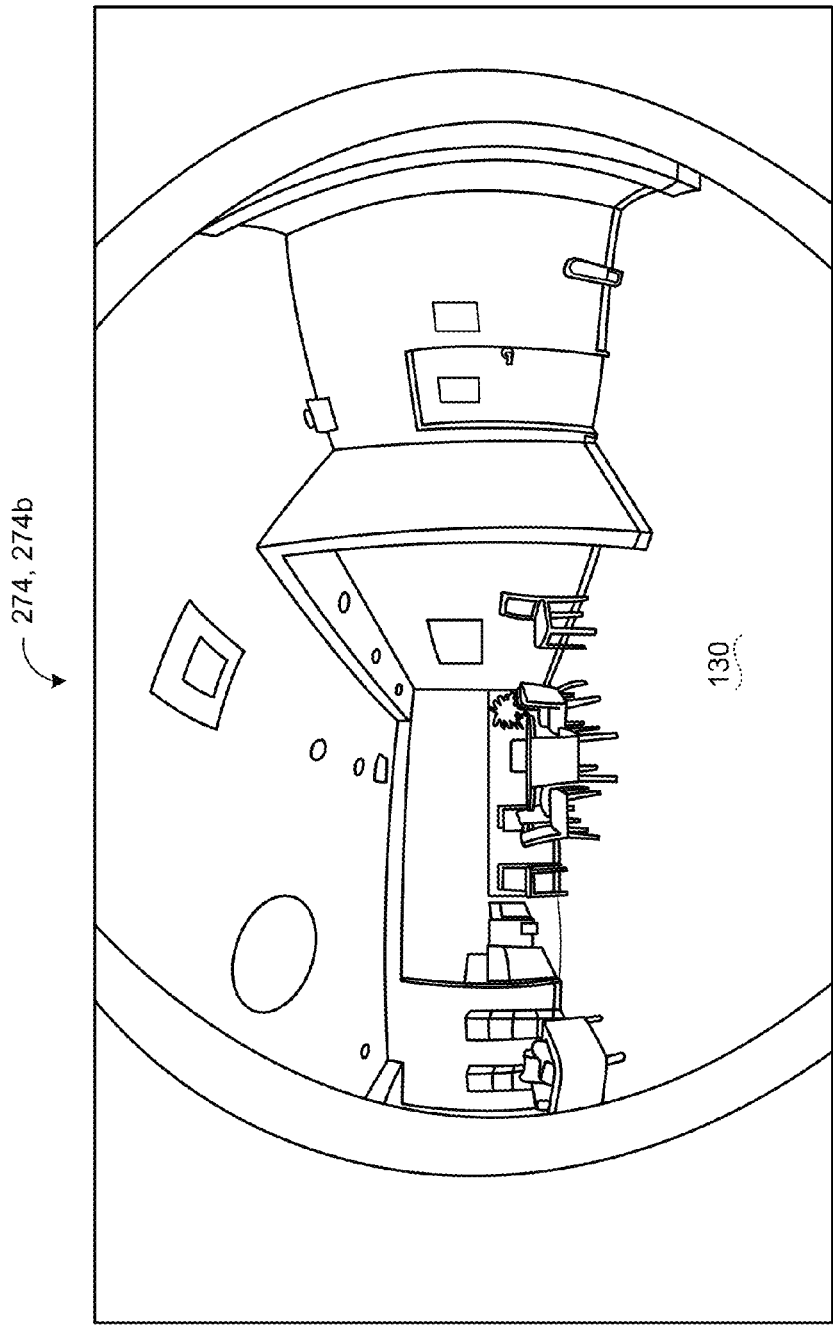
FIG. 5A is a plan view of a raw image from a right peripheral imaging sensor of the mobile robot of FIG. 2A.
Figure 5B:
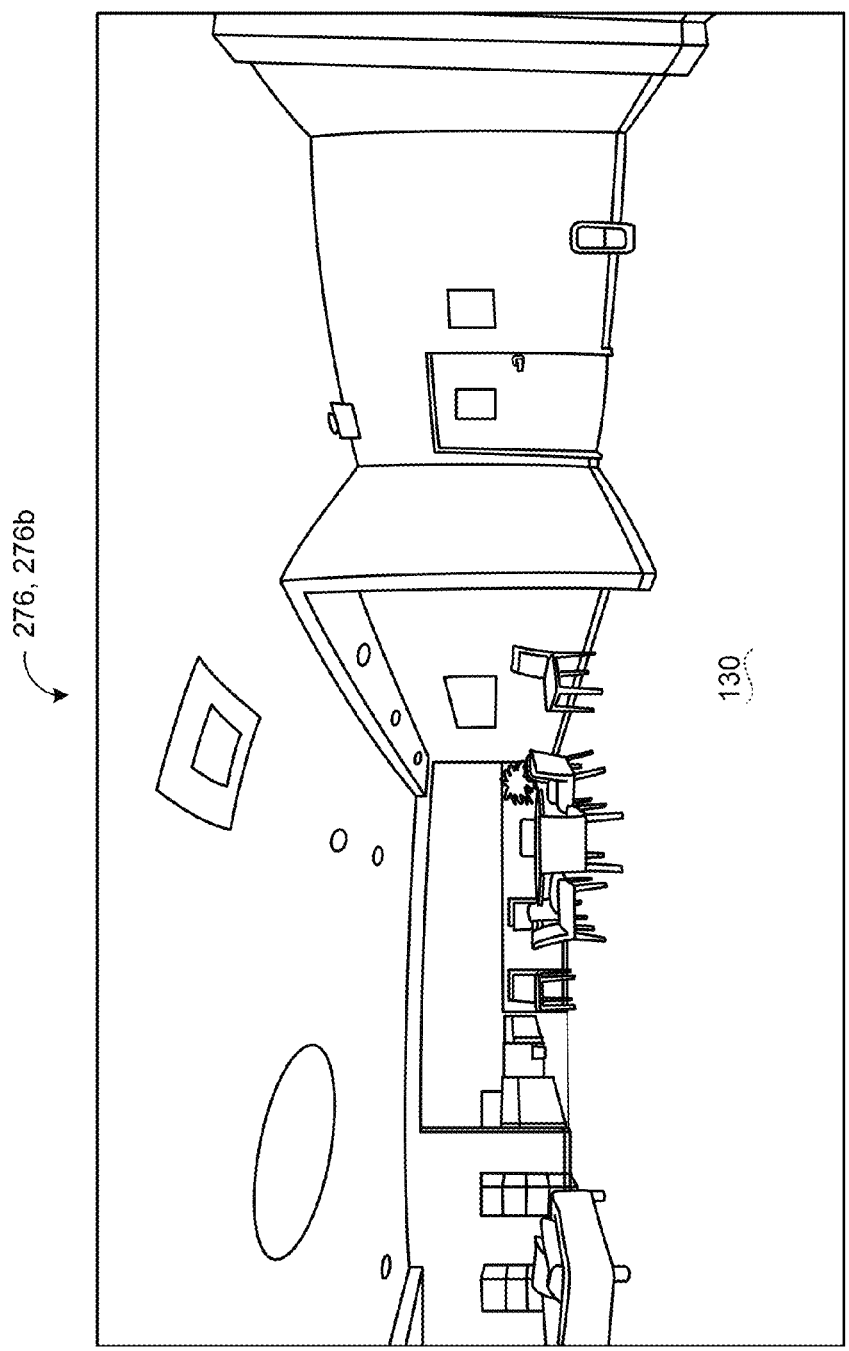
FIG. 5B is a plan view of a corrected video feed resulting from the calibration and/or correction of the raw image of FIG. 5A.
Figure 6A:
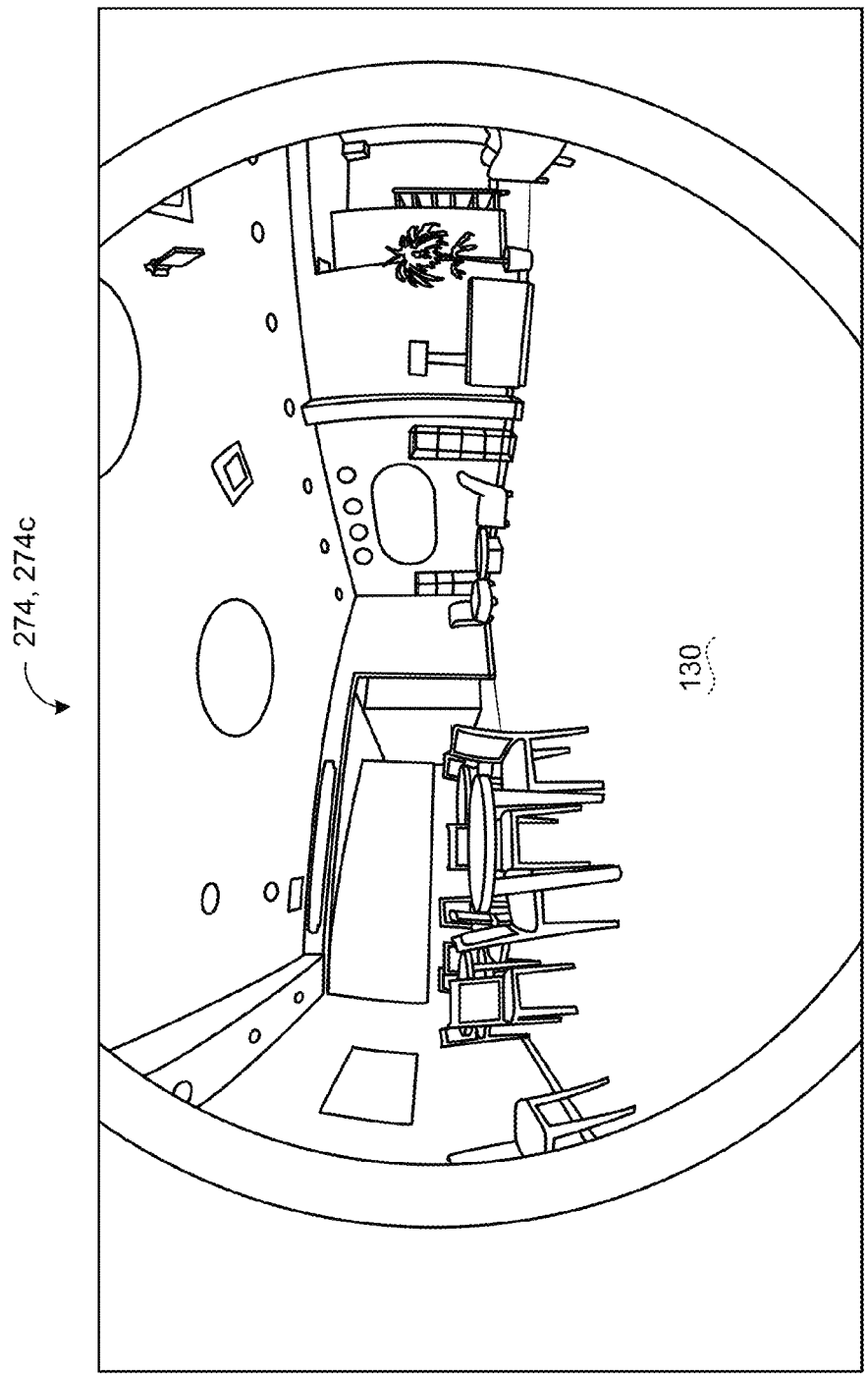
FIG. 6A is a plan view of a raw image from a left peripheral imaging sensor of the mobile robot of FIG. 2A.
Figure 6B:
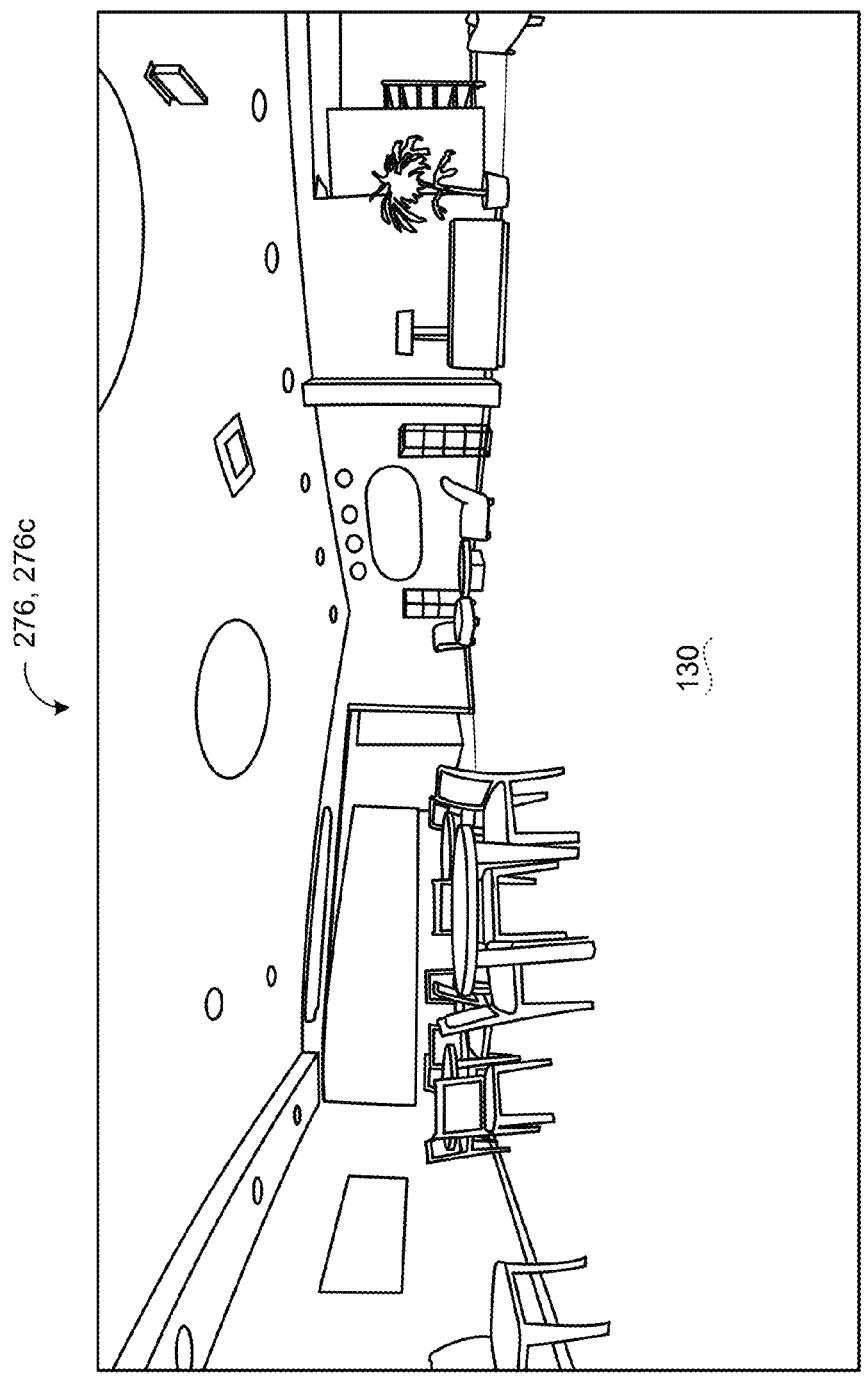
FIG. 6B is a plan view of a corrected video feed resulting from the calibration and/or correction of the raw image of FIG. 6A.

Each of the peripheral imaging sensors 270b, 270c of the robot 200 utilizes a circular fisheye lens 278b, 278c, in some implementations, in order to capture a sufficiently-wide field of view 272b, 272c, as previously discussed. The raw video feed 274b, 274c captured by such imaging sensors 270b, 270c is shaped as a circle. For example, the raw video feed 274b from the right imaging sensor 270b illustrated in FIG. 5A and the raw video feed 274c from the left imaging sensor 270c illustrated in FIG. 6A provide circular images/video feeds of different portions of the viewing area 352 of the premise 130, which include heavy distortions. The graphics processing unit 286 of the computing device 282 of the robot 200 corrects the distortion. First, the graphics processing unit 286 de-warps the circular raw video feeds (images) 274b, 274c into panoramic video feeds (images). Then, the graphics processing unit 286 texture-maps the panoramic video feed (image) onto a cylindrical or hemispherical surface to correct the majority of the distortions. The right corrected video feed (image) 276b of a portion of the premise 130 is illustrated in FIG. 5B. The left corrected video feed (image) 276b of a portion of the premise 130 is illustrated in FIG. 6B.

The robot 200 transmits the corrected video feeds (images) 276, 276a-c to the user device 300 for displaying the remote view 354 on the screen 350 of the user device 300. As shown in FIG. 7A, the screen 350 of the user device 300 displays a standard remote view 354s of the premise 130. The standard remote view 354s presents the corrected video feed 276, 276a-c in a bay-window-shaped display having a center portion 354a, a right portion 354b, and a left portion 354c. The corrected video feed 276a originating from the forward imaging sensor 270a forms the center portion 354a of the remote view 354. The right corrected video feed 276b originating from the right imaging sensor 270b forms the right portion 354b of the remote view 354. The left corrected video feed 276c originating from the left imaging sensor 270c forms the left portion 354c of the standard remote view 354s. The standard remote view 354s provides video feeds viewed by a remote user 10 at a standard zoom (e.g., a 1× zoom) such that the screen 350 of the user device 300 displays images/video feeds from each FOV 272, 272a-c. The one-times, standard zoom associated with the standard remote view 354s may enable the screen 350 of the user device 300 to display the full horizontal FOV 272ah of the forward imaging sensor 270a at the middle of the screen 350 as the center portion 354a. For example, in implementations, the center portion 354a spans approximately sixty percent of the screen 350. Additionally, the one-times, standard zoom associated with the standard remote view 354s enables the screen 350 of the user device 300 to display approximately 30 degrees of the panoramic horizontal FOVs 272bh, 272ch of the peripheral imaging sensors 270b, 270c as the right portion 354b and the left portion 354c of the remote view 354. The 30 degree portions of the panoramic horizontal FOVs 272bh, 272ch of the peripheral imaging sensors 270b, 270c are near or closest to the forward FOV 272 while not overlapping the for forward FOV 272. The bay-window-shaped display of the standard remote view 354s includes break lines 358 (also referred to as video feed dividers) to indicate the transition from one portion 354a-c of the remote view 354 to another portion of the remote view 354 on the screen 350, as described earlier with reference to FIGS. 3A-3C. In some implementations, portions of the screen 350 above and below the remote view 354 are not be utilized to display the remote view 354. Thus, while the standard remote view 354s provides an immersive video experience for the remote user 10 (i.e., an approximately 150 degree horizontal field of view at a reasonably detailed—one-times (1×) zoom—standard zoom level) when displayed on the screen 350 of the user device 300, the shape of the standard remote view 354s may leave portion of the screen 350 available for other views or displayed information (e.g., about the robot 200 or the environment about the robot 200).

In FIG. 7A, the screen 350 displays a zoomed-out view for a downwardly tilted forward imaging sensor 270a. The divider lines 358, 358a-b tilt to form a "V" and portions of each fixed peripheral camera, the right and left imaging sensors 270b-c, are displayed. Those right and left video feed portions 276b-c selected for display on the screen 350 correspond with the vertical position of the horizon of the forward video feed 276a. In some implementations, as the forward imaging sensor 270a tilts downward at an angle γ, the center of the image shifts downward and the portions of each image or video feed 274b-c captured by the right and left imaging sensors 270b-c shifts to a corresponding latitude on the hemisphere of the fish eye lens 278b-c of each of the right and left imaging sensors 270b-c. By selecting portions of each hemispherical lens of the right and left imaging sensors 270b-c that correspond with the vertical tilt of the forward imaging sensor 270a, the robot 200 virtually tilts the affixed right and left imaging sensors 270b-c to create a fully tilted view of the peripheral area about the robot 200 as well as ahead of the robot 200.

Figure 7B:
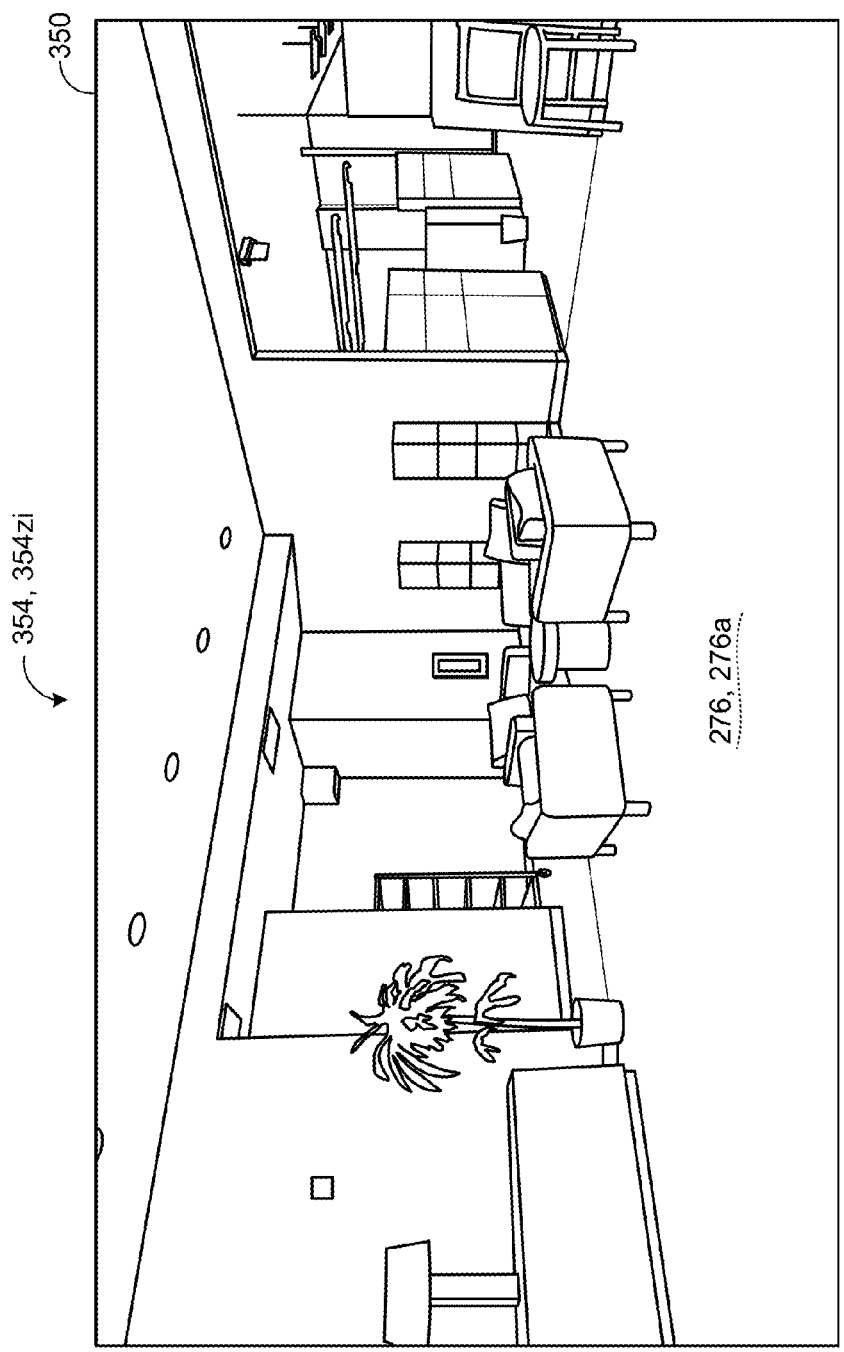
FIG. 7B is a front view of the screen of the user device of FIG. 3A displaying a zoomed-in remote view of overlaid corrected video feeds.
Figure 7C:
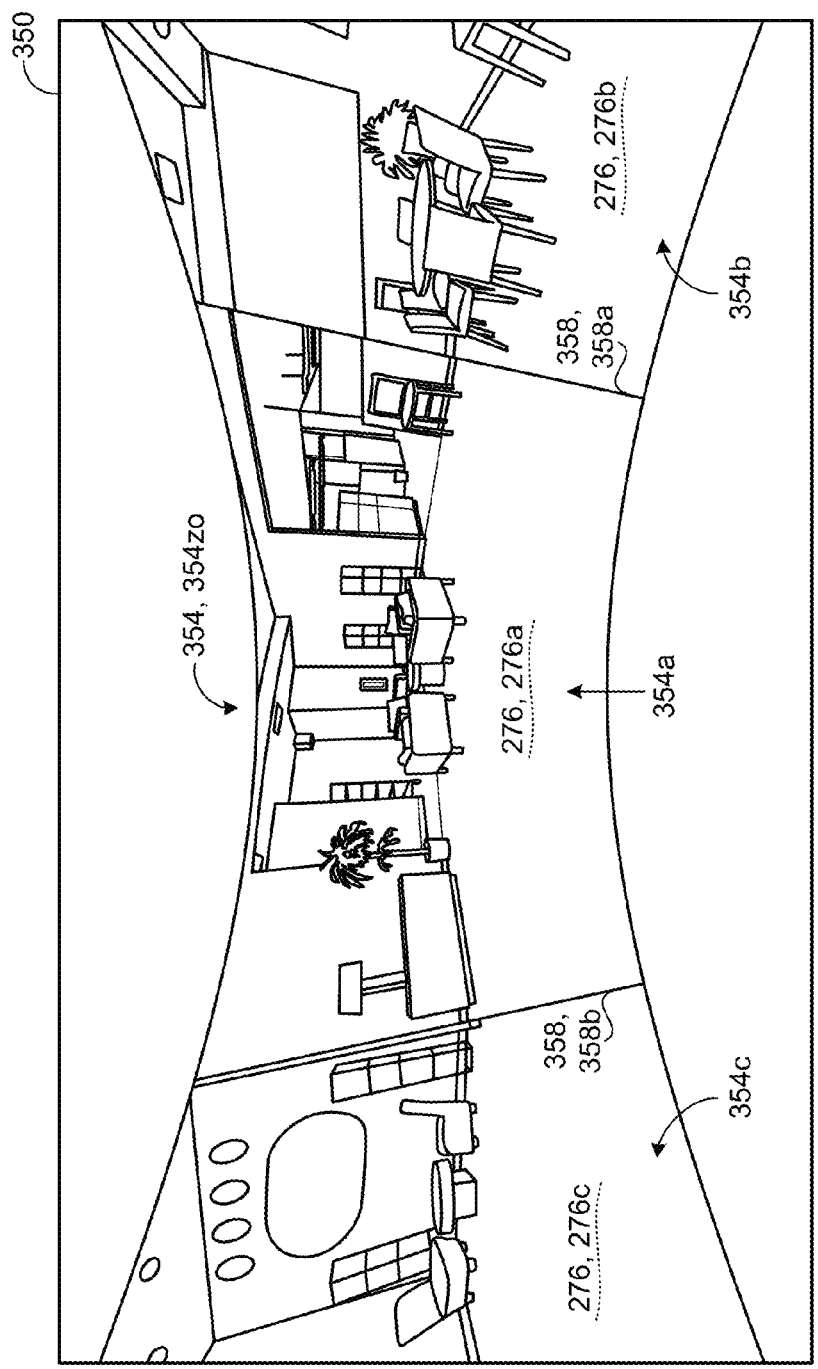
FIG. 7C is a front view of the screen of the user device of FIG. 3A displaying a zoomed-out remote view of overlaid corrected video feeds.

Referring to FIG. 7B, the screen 350 of the user device 300 may display a zoomed-in remote view 354zi of the premise 130, which provides a view at any zoom greater than 1× (e.g. 2×-6×). The zoomed-in remote view 354zi of FIG. 7B presents the corrected images/video feeds 276 at about a 2× zoomed view. At this zoomed-in level, the zoomed-in remote view 354zi presents only the corrected image/video feed 276a from the forward imaging sensor 270a, which is displayed across the full screen 350. Generally, the zoomed-in remote view 354zi provides video feeds viewed by a remote user 10, such that the screen 350 of the user device 300 displays images/video feeds ranging from the full forward horizontal FOV 272ah of the forward imaging sensor 270a to a portion of the forward horizontal FOV 272ah. In some implementations of the system 100, the user 10 has an option to view the zoomed-in remote view 354zi and then pan the range of the viewing area 352 displayed on the screen 350, such that portions of the right corrected video feed 276b or portions of the left corrected video feed 276c may be displayed on the screen 350 at the zoomed-in viewing level. When the range of viewing area 352 is panned from left to right or from right to left, the first break line 358a indicating the transition from the center portion 354a to the right portion 354b (i.e. the video feed divider between the center corrected video feed 276a and the right corrected video feed 276b), or the second break line 358b indicating the transition from the center portion 354a to the left portion 354c (i.e. the video feed divider between the center corrected video feed 276a and the left corrected video feed 276c) may be included as part of the zoomed-in remote view 354zi that is displayed on the screen 350.

Referring to FIG. 7C, the screen 350 of the user device 300 may display a zoomed-out remote view 354zo of the premise 130, which provide images/video feeds 276 of a horizontal range exceeding 150 degrees (e.g., the zoomed-out remote view 354zo may display 180 degrees or 220 degrees of the viewing area 352 of the premise 130). The zoomed-out remote view 354zo presents the corrected video feed 276, 276a-c in the bay-window-shaped display having the center portion 354a, the right portion 354b, and the left portion 354c. The zoomed-out remote view 354zo provides video feeds viewed by a remote user 10 at a zoom level such that the screen 350 of the user device 300 displays video feeds 276 from each FOV 272, 272a-c of the imaging sensors 270, 270a-c. The zoom associated with the zoomed-out remote view 354zo is set such that the full horizontal FOV 272ah of the forward imaging sensor 270a is displayed at the middle of the screen 350 as the center portion 354a (for example, the center portion spans approximately forty percent of the screen 350) and such that approximately fifty degrees of the panoramic horizontal FOVs 272bh, 272ch of the peripheral imaging sensors 270b, 270c are displayed in the right and left portions 354b, 354c of the remote view 354. The bay-window-shaped display of the zoomed-out remote view 354zo includes break lines 358 (video feed dividers) to indicate the transition from one portion 354a-c of the zoomed-out remote view 354zo to another portion 354a-c of the zoomed-out remote view 354zo on the screen 350. Portions of the screen 350 above and below the zoomed-out remote view 354zo are utilized to display other information as well.

Figure 7D:
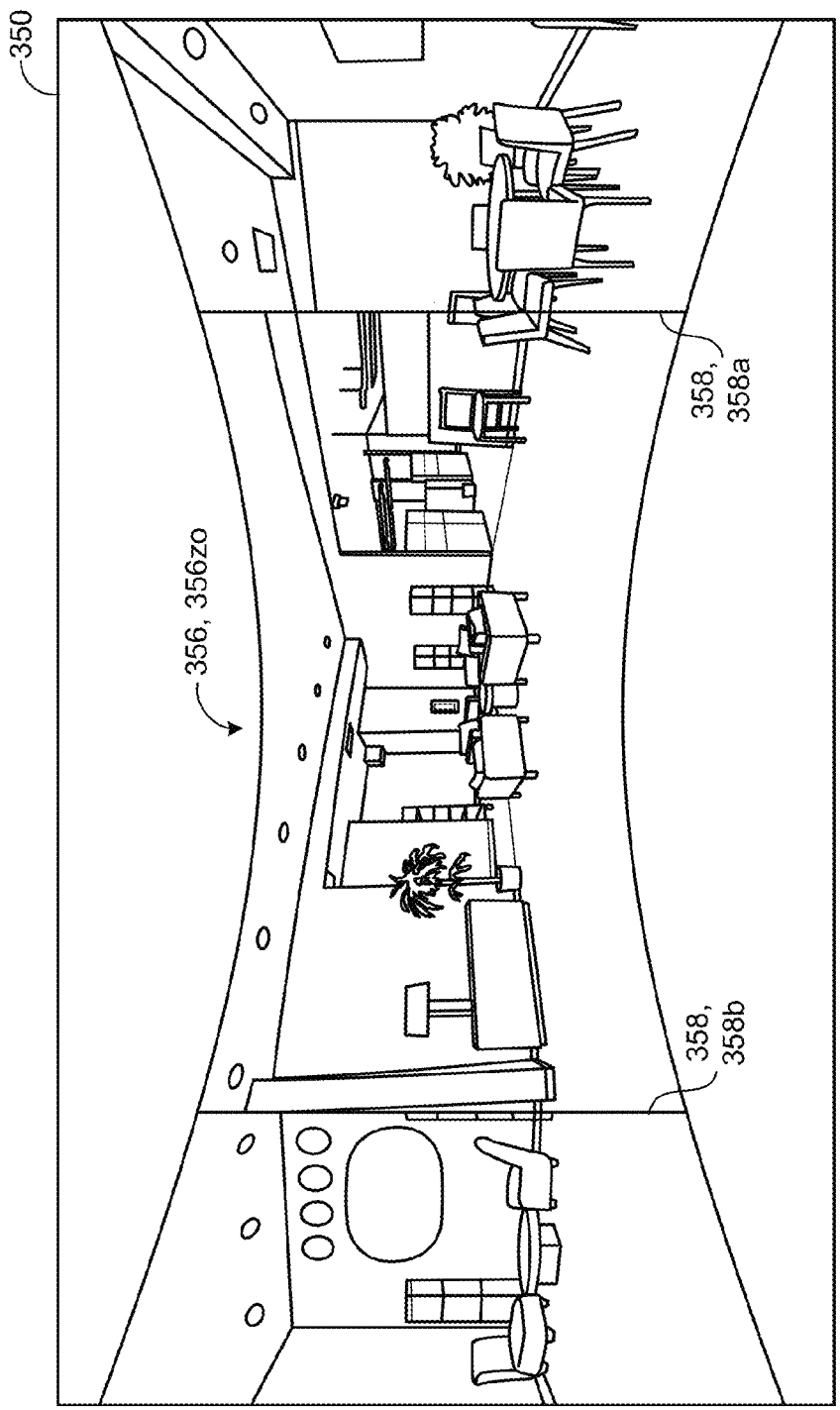
FIG. 7D is a front view of the screen of the user device of FIG. 3A displaying a corrected remote view of overlaid corrected video feeds.
Figure 8A:
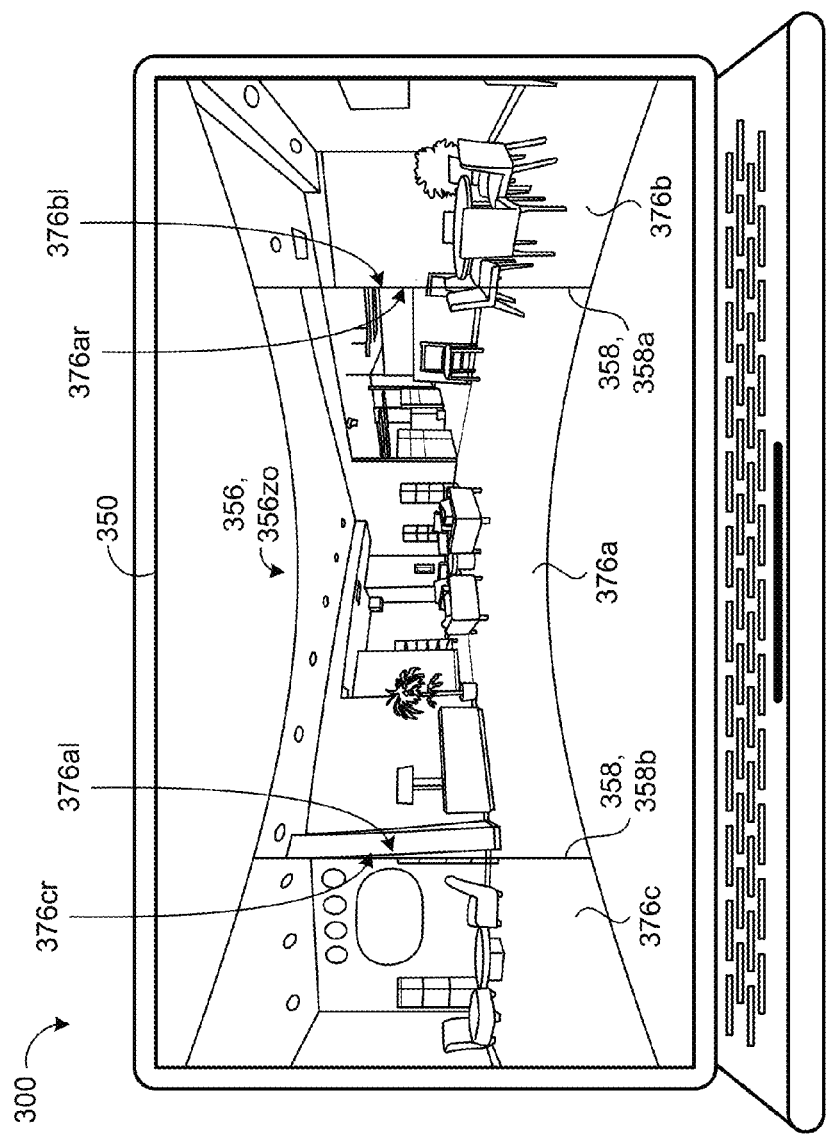
FIG. 8A is a front view of the user device of FIG. 3A displaying the corrected remote view of FIG. 7D on the screen.

Referring to FIG. 7D, the computing device 282 of the robot 200 may combine and align (e.g., overlay so that horizons align between video feeds but without stitching features together between the forward feed and the left and right feeds as in a continuous panoramic view) the corrected video feeds 276, 276a-c in a bay-window-shaped display (as illustrated in FIG. 7A) to form a remote view 354 and zoom-in or -out on the remote view 354 prior to transmitting the real-time image data as part of the sensor data 202 for viewing on the screen 350 of the user device 300 as shown in FIG. 1B. "Overlay" here does not mean matching features from the forward video feed 274a, 276a with features from the left and/or right video feeds 274b-c, 276b-c and laying one feed 247, 276 over the other to create an uninterrupted panoramic remote view 354. Instead, here, overlay means combining portions of the forward and peripheral video feeds 274, 274a-c, 276, 276z-c so that they are sized similarly and so that their horizons align where the video feeds are abutted at the video feed dividers 358. Additionally, the computing device 282 of the robot 200 also scales and calibrates the overlaid images/video feeds 274, 276 to form an adjusted remote view 356. In the example shown, the robot 200 has transmitted an adjusted remote view 356zo of the zoomed-out remote view 354zo. The adjusted remote view 356zo includes a seamless overlay of the corrected video feeds 276, 276a-c in a bay-window-shaped display on the screen 350. Here, "seamless" does not mean that the three video corrected feeds 276a-c are stitched so that their edge features mate to create a single, uninterrupted panoramic view. Here, as shown in FIG. 8A, "seamless" means the right video feed 276b and the left video feed 276c are abutted with the forward video feed 276a to create a contiguous view of the combined video feeds despite their not having edge mated features. Even without edge mated features, the views are all sized so that their horizons, floor and ceiling portions of the images align at their abutment to provide an immersive experience for the user monitoring the environment of the mobile robot 200. While FIG. 7D illustrates an adjusted remote view 356zo of the zoomed-out remote view 354zo from FIG. 7C, the computing device 282 of the robot 200 may also correct the standard remote view 354s to create a corresponding adjusted remote view 356a or it may correct remote views at other zoomed levels. Additionally, the break lines (video feed dividers) 358, 358a-b appear on the adjusted remote view 356a shown in FIG. 7D. However, the computing device 282 of the robot 200 may hide these break lines 358, 358a-b on other adjusted remote views 356 to provide a seamless combination of the forward, right, and left video feeds 276, 276a-c as the remote view 354.

Figure 8B:
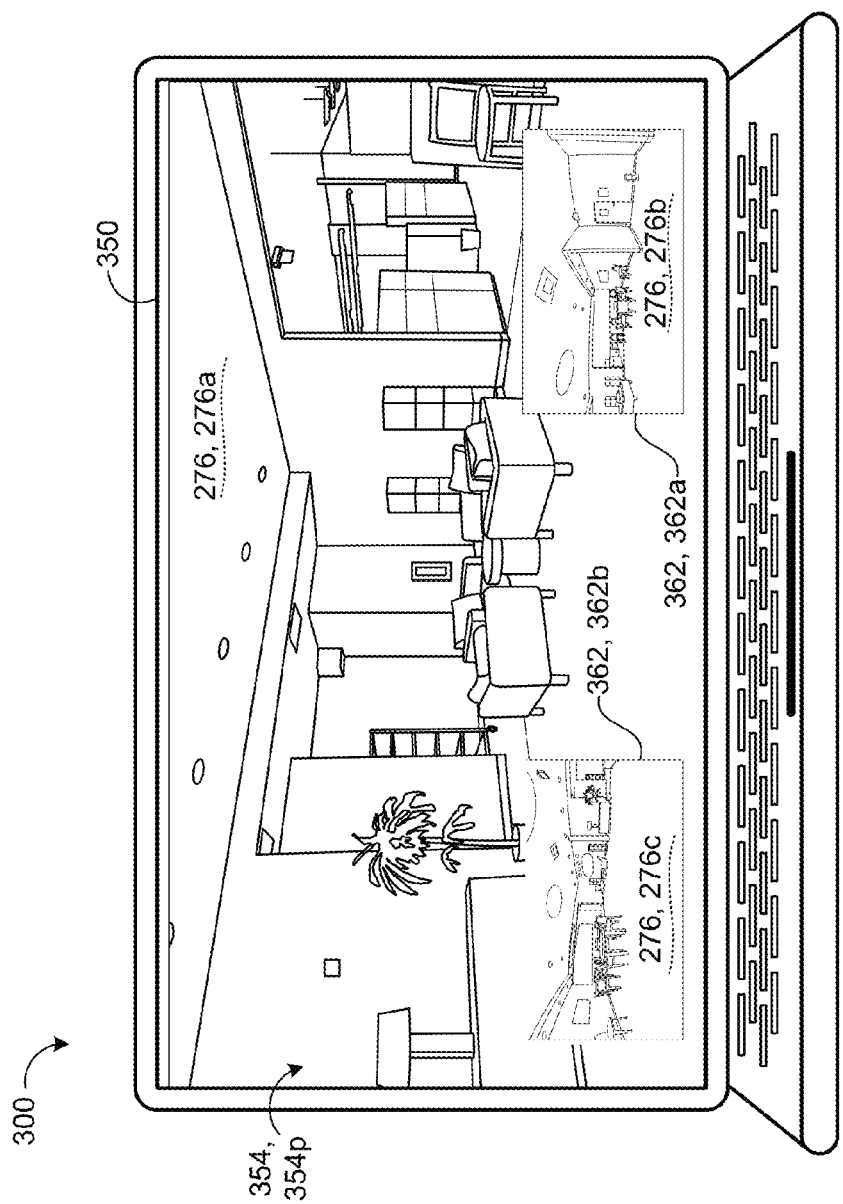
FIGS. 8B and 8C are front views of the user device of FIG. 3A displaying other remote views on the screen.
Figure 8C:
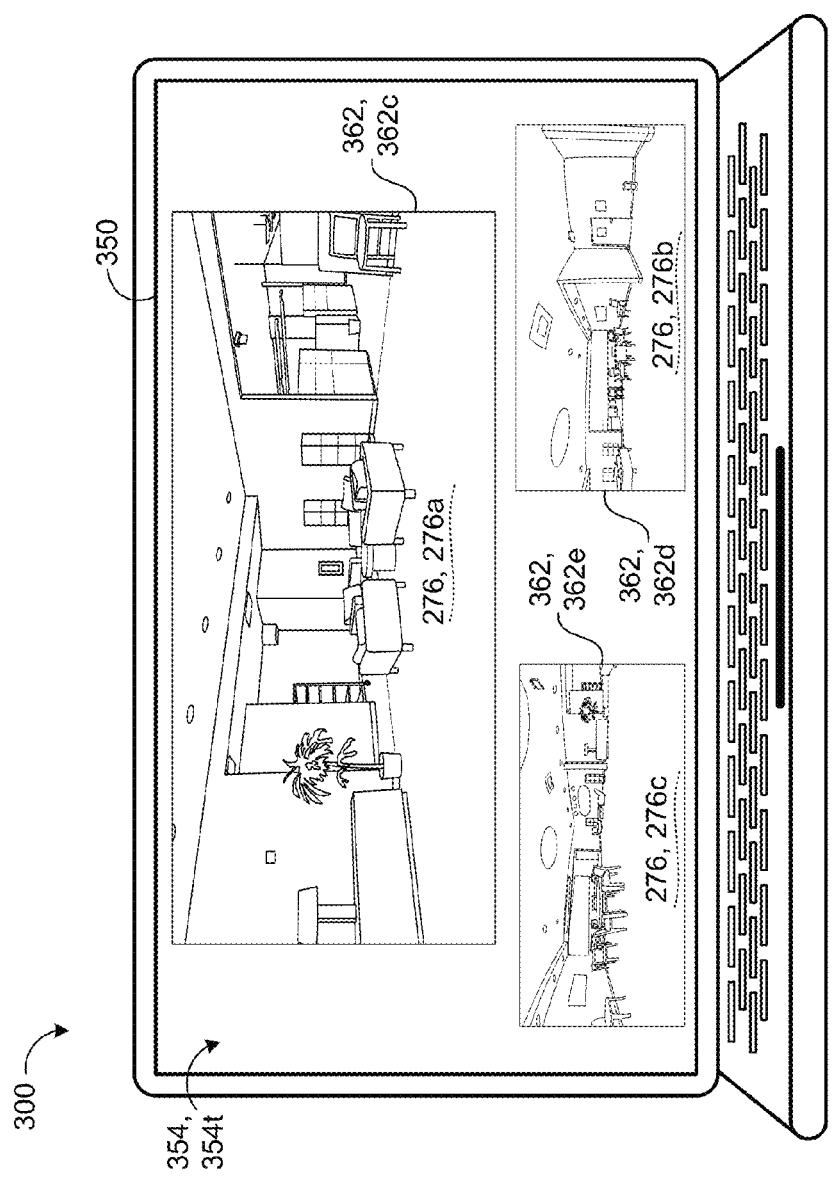

Referring to FIG. 8A, the adjusted remote view 356zo of FIG. 7D is shown as being displayed on the screen 350 of the user device 300. In some implementations, as described earlier with reference to FIGS. 7A-7D, the computing device 282 of the robot 200 combines the corrected video feeds 276, 276a-c to create such an adjusted remote view 356zo that the robot 200 transmits to the network 120, the user device 300 receives, and the screen 350 displays to provide the user 10 with an immersive video experience. In other implementations, as illustrated in FIGS. 8B and 8C, the screen 350 displays remote views 354 of other forms to provide the user 10 with an immersive video experience. In a teleconferencing environment, the immersive video experience allows the user 10 navigate the robot 200 down a hall while seeing the environment with a field of view 272 at least equal to, if not better, than a human perceivable view of the environment. For example, the immersive video experience provided by the robot 200 allows the user 10 to maneuver down a hallway while avoiding obstacles, enter a conference room, identify a conference table having several participants seated thereabout, maneuver up to the conference table at an open/available spot, and allow the user 10 to see and engage in a conversation with the participants, while not being too close or too far from the participants. The immersive video experience allows a user to determine if someone is approaching the robot 200 from behind and move off to the side if the approaching person is traveling at a speed greater than the robot 200. In this way, the robot 200 is more human like in its interactions, maintaining preferred distances for personal space and not impeding passersby.

Referring specifically to FIG. 8B, the computing device 282 of the robot 200 has overlaid the corrected video feeds 276, 276a-c in a picture-in-picture remote view 354p. The full width of the screen 350 presents a corrected video feed 276a representing the full horizontal FOV 272ah (or a portion of the horizontal FOV 272ah) of the forward imaging sensor 270a. The screen 350 also presents two windows 362 arranged on the screen 350 to create the picture-in-picture remote view 354p of the remote view 354. A right window 362a presents the corrected video feed 276b corresponding to the right peripheral imaging sensor 270b. A left window 362b presents the corrected video feed 276c corresponding to the left peripheral imaging sensor 270c. The right window 362a and the left window 362b each include a corrected video feed 276b, 276c spanning the full respective horizontal FOV 272bh, 272ch or a portion of the respective horizontal FOV 272bh, 272ch. Therefore, the picture-in-picture remote view 354p allows the user 10 to view the full horizontal FOVs 272bh, 272ch of both the right imaging sensor 270b and the left imaging sensor 270c without truncation. Each window 362, 362a-b may span approximately forty percent of the width of the screen 350. However, each window 362, 362a-b may span more or less than forty percent of the width of the screen 350 without deviating from the design of this disclosure.

Referring specifically to FIG. 8C, the computing device 282 of the robot 200 has overlaid the corrected video feeds 276, 276a-c in a triangular format remote view 354t, which includes three windows 362, 362c-e arranged on the screen 350. Across the full width or less of the screen 350, a first window 362c presents a corrected video feed 276a representing the full horizontal FOV 272ah (or a portion of the horizontal FOV 272ah) of the forward imaging sensor 270a. The screen 350 also presents two additional windows 362d, 362e arranged on the screen 350 to create the triangular format 354t of the remote view 354. A second window 362d (arranged in FIG. 8C at the lower right of the screen 350) presents the corrected video feed 276b corresponding to the right peripheral imaging sensor 270b. A third window 362e (arranged in FIG. 8C at the lower left of the screen 350) presents the corrected video feed 276c corresponding to the left peripheral imaging sensor 270c. The triangular arrangement provides a visually appealing remote view 354t, while displaying a larger horizontal FOV 272bh, 272ch of both the right imaging sensor 270b and the left imaging sensor 270c, as compared to the standard remote view 354s. Moreover, in some examples, the spatially separate windows 362c-e allow for separate processing by the computing device 282 of the robot 200. The second window 362d and the third window 362e include a corrected video feed 276b, 276c spanning the full respective horizontal FOV 272bh, 272ch or a portion of the respective horizontal FOV 272bh, 272ch. The second window 362d and the third window 362e span approximately forty percent of the width of the screen 350 or they may span more or less than forty percent of the width of the screen 350 without deviating from the design of this disclosure. Portions of the screen 350 may remain unutilized when the robot 200 transmits a triangular format 354t for the remote view 354.

The immersive full peripheral remote view 354 viewable by the remote user 10 on the user device 300 allows the remote user 10 to engage in teleconferencing experiences that are not possible with a single forwardly aimed camera. For example, rather than having the telepresence robot 200 positioned away from a meeting table, so that the telepresence robot 200 can have a single field of view capturing a video feed of the entire table and/or an entire group of participants. The robot 200 of this disclosure can be maneuvered right up to the table, like a regular participant, and provide the remote user 10 with an immersive full peripheral remote view 354 that captures the table, the participants (forward, to the sides, and slightly partially to the rear), and the surroundings. The robot 200 offers the remote user 10 with a better-than-human perception of the remotely viewed area (the remote premise 130). Moreover, the peripheral awareness afforded by the robot 200 allows the remote user 10 to teleconference with participants proximate and far away from the robot 200, and in front of the robot 200 and to a side of the robot 200. While maneuvering the robot 200, the remote user 10 can use the immersive full peripheral remote view 354 to better see the environment about the robot 200, for example, to identify and avoid obstacles, see corners while turning, maneuver in tight spaces, and more. The peripheral awareness afforded the robot 200 via the vision system 268 allows the robot 200 to autonomously identify obstacles (stationary or moving) and maneuver around or away from the identified obstacles. For example, the robot 200 may detect a person walking straight toward it and then side step to move out of the way. The application 330 of the user device 300 may also allow the remote user 10 to execute short-distance maneuvers, such as side stepping, and/or medium distance maneuvers, such as local waypoint driving and preprogrammed sharp turns, to navigate about a group of participants. The immersive full peripheral remote view 354 provides a peripheral awareness about the robot 200 that is better than that of a human about her/himself. This allows the user to have eyes in the back of their head. In embodiments, the robot 200 may comprise one or more additional cameras aimed in a backward facing direction for complete 360 degree awareness of surroundings.

The application 330 of the user device 300 allows the remote user 10 to send commands 204 to the robot 200 that facilitate an enhanced teleconferencing experience. For example, the application 330 allows the remote user 10 to select a zero-zoom command that causes the forward imaging sensor 270a to change state to a zoom-out focal range, for example to see as many participants as possible. In some instances, the bay-window-shaped standard remote view 354s (as discussed with reference to FIG. 8A) achieves the zero-zoom command. When the conversation involves multiple participants, the triangular format 354t (as discussed with reference to FIG. 8C) can be used to view different participants in different windows 362, 362 c-e. The application 330 also allows the remote user 10 to select a point-and-look operation that commands the robot 200 to maneuver, tilt the forward imaging sensor 270a, and/or alter the zoom level of the forward imaging sensor 270a to view an area corresponding to a selected point on the immersive full peripheral remote view 354 displayed on the screen 350. As described above with reference to FIG. 3A the lean angle α of the divider lines 358 corresponds with a tilt angle γ of the forward facing camera such that selecting an area on either the right portion 354b or the left portion 354c of the combined video feed 354 directs the robot 200 to spin, or rotate, in the θz direction, by an amount that enables the lean angle α to remain unchanged. In other words, all points along the divider lines 358 are the same pan degree θz away from the forward view 354a.

Moreover, the application 330 allows the remote user 10 to select a sit-to-stand operation that commands the robot 200 to alter a height of the head 260 to match, align with, or otherwise achieve a same-level eye contact with a participant.

Figure 9:
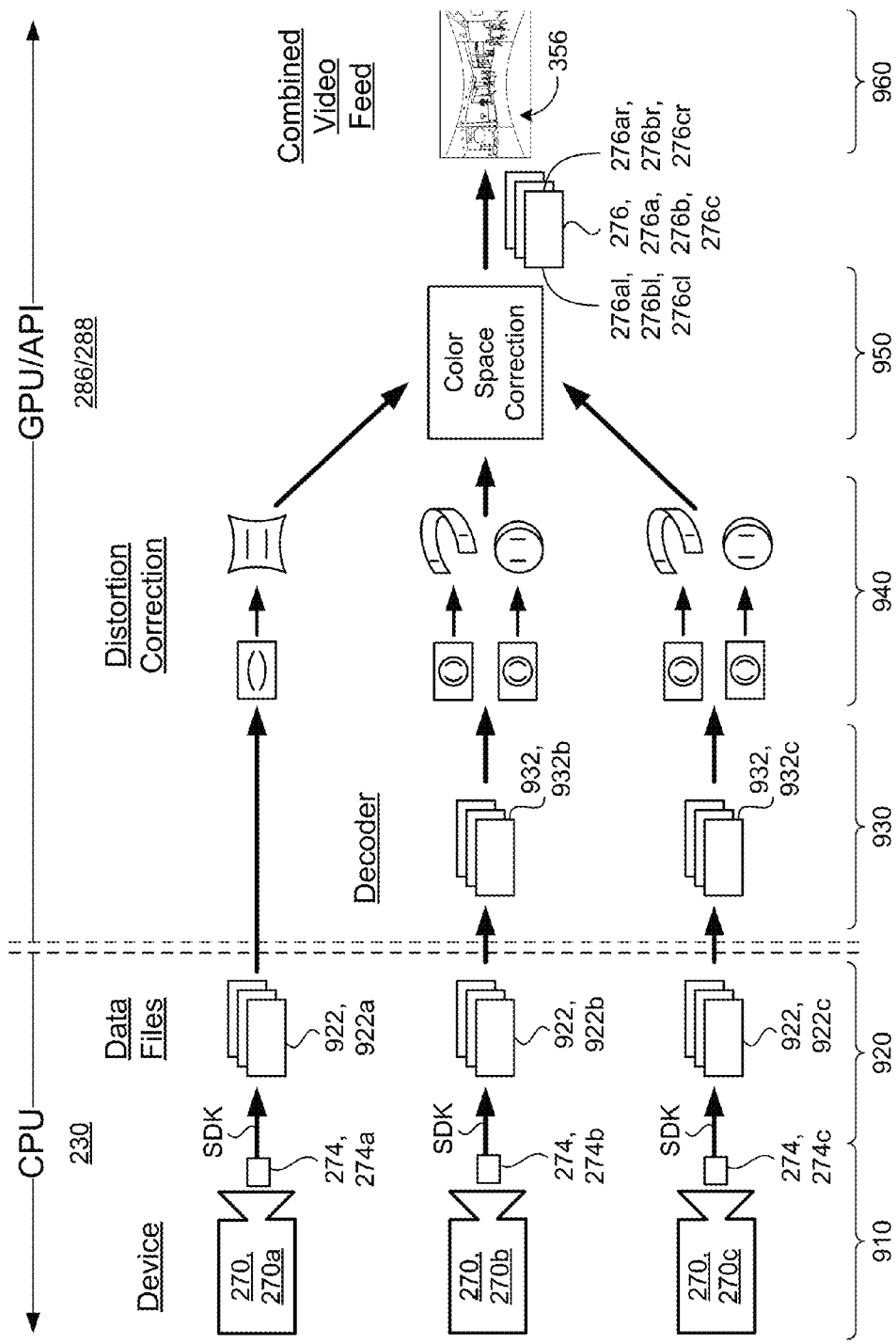
FIG. 9 is functional block diagram of a process for creating a remote view of overlaid corrected video feeds from the imaging sensors of the robot of FIG. 2A.

Referring to FIG. 9A, the robot 200, when operating as an instrument of the system 100 for providing an immersive video experience for a remote user 10, performs a series of steps to acquire raw image data 274 and to transform the raw image data 274 such that it provides an immersive video experience when displayed on the screen 350 of the user device 300. At step 910, each of the imaging sensors 270 create raw image data 274 (e.g., video feeds). The forward imaging sensor 270a, the right imaging sensor 270b, and the left imaging sensor 270c each create unique raw image data 274a, 274b, 274c corresponding to its particular field of view 272a, 272b, 272c. At step 920, the computing device 282 of the robot 200 creates one or more data files 922, 922a-c corresponding to the raw image data 274, 274a-c from each imaging sensor 270, 270a-c. One or more software development kits (SDKs) may be incorporated into the computing device 282 in order to create the data files 922, 922a—. For example, a Blackmagic HD-SDI 1080p30 capture device creates a YUV422 data file 922a from the raw image data 274a created by the forward imaging sensor 270a, and a libv412 device memory-maps the raw image data 274b, 274c created by the peripheral imaging sensors 270b, 270c to create a MJPEG data file 922b, 922c. In cases where some of the data files 922, 922a-c exist in alternate formats, the graphics processing unit 286, or another component of the controller system 280 capable of performing the necessary decoding, perform a decoding step 930. For example, a hardware-accelerated JPEG decoder transforms the MJPEG data files 922, 922b, 922c into YUV data files 932, 932b-c. At step 940, the graphics processing unit 286 and the application programming interface 288 perform distortion correction and/or calibration of the data files 922, 922a, 932, 932b-c. Polynomial functions may be utilized to correct distortions, such as barrel distortion, associated with the raw image data 274 recorded by some high definition cameras (e.g., the forward imaging sensor 270a). Three-dimensional texture mapping corrects distortions associated with the raw image data 274 recorded by some wide-angle cameras utilizing fisheye lenses (e.g., the right and left peripheral imaging sensors 270b, 270c) while creating a panoramic view from the fisheye image. Additionally, correction of distortions associated with the raw image data 274 recorded by some wide-angle cameras utilizing fisheye lenses (e.g., the right and left peripheral imaging sensors 270b, 270c) may require fisheye-to-hemispherical image correction. At step 950, the graphics processing unit 286 and the application programming interface 288 perform color space correction/conversion by converting the corrected images/video feeds 276, 276b-c from YUV to an RGB color model. At step 960, the corrected video feeds 276, 276b-c are overlaid to form a combined video feed, such as the previously discussed adjusted remote view 356, that the robot 200 transmits for viewing by the remote user 10 on the screen 350 of the user device 300. The adjusted remote view 356 includes the overlain corrected video feeds 276, 276a-c that provides the remote user 10 with an immersive peripheral video experience.

Figure 10:
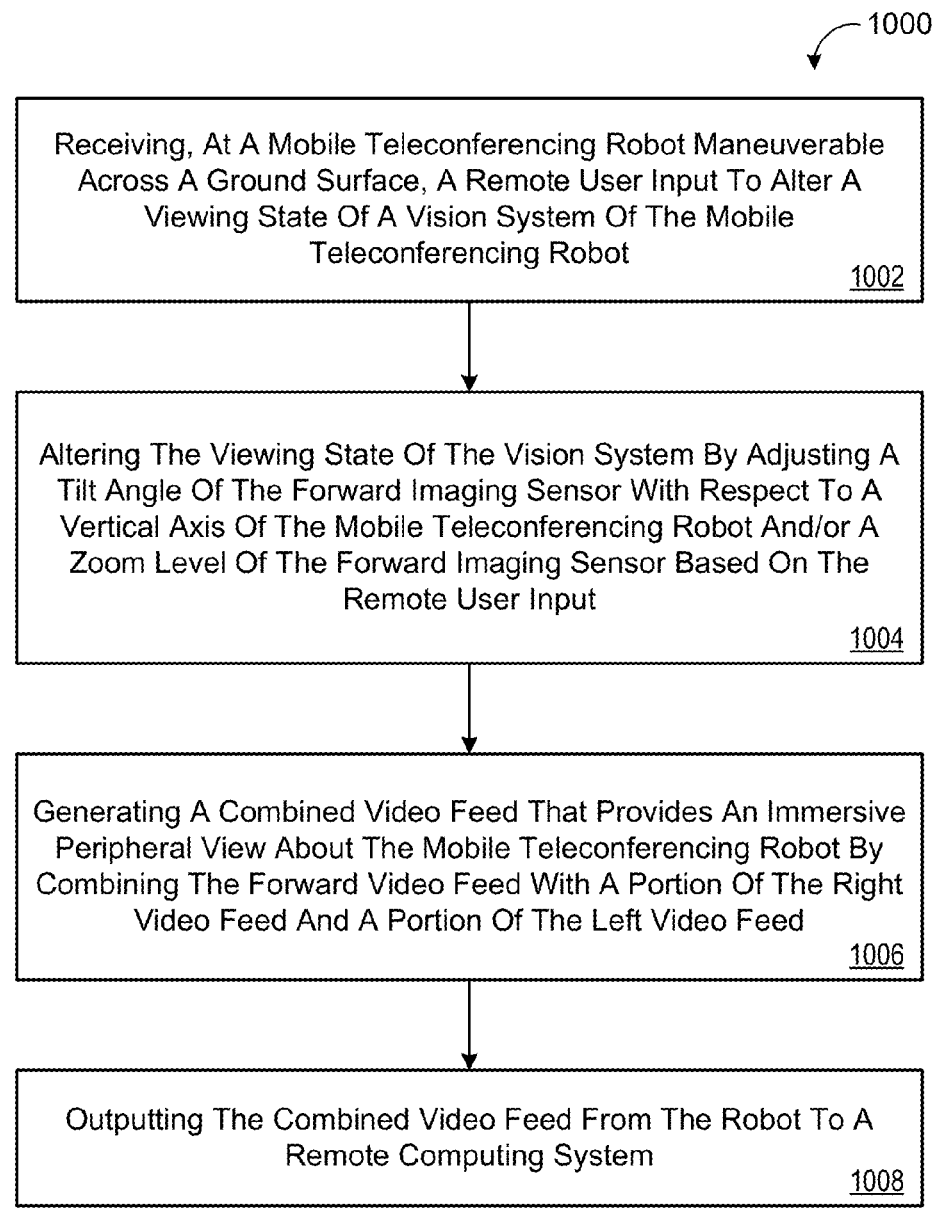
FIG. 10 is an exemplary arrangement of operations undertaken by data processing hardware of the robot of FIG. 2A to carry out the process of FIG. 9A.

FIG. 10 illustrates an exemplary arrangement of operation undertaken by the robot 200 to perform a method 1000 for providing an immersive peripheral video feed 356 for real-time viewing, such as on the screen 350 of the user device 300. At block 1002, the method 1000 includes receiving, at a mobile teleconferencing robot 200 maneuverable across a ground surface 135, a remote user input 204 to alter a viewing state of a vision system 268 of the mobile teleconferencing robot 200. As discussed earlier, the vision system 268 includes a forward imaging sensor 270a, a right imaging sensor 270b, and a left imaging sensor 270c. The forward imaging sensor 270a is arranged on a top portion 260a of the mobile teleconferencing robot 200 at a first location to have a forward field of view 272a aimed along a forward drive direction F of the mobile teleconferencing robot 200 and configured to capture a forward video feed 274a. The right imaging sensor 270b is arranged on a right portion 260b of the mobile teleconferencing robot 200 at a second location vertically apart from the first location to have a right field of view 272b aimed in a right direction R with respect to the forward drive direction F. The right imaging sensor 270b is configured to capture a right video feed 274b. The left imaging sensor 270c is arranged on a left portion 260c of the mobile teleconferencing robot 200 at a third location vertically apart from the first location to have a left field of view 272c aimed in a left direction L with respect to the forward drive direction F. The left imaging sensor 270c is configured to capture a left video feed 274c. In some implementations, the right and left imaging sensors 270a, 270b are aimed away from each other and at least partially away from the forward drive direction F, and the right and left fields of view 272b, 272c at least partially overlap the forward field of view 272a. At block 1004, the method 1000 includes altering the viewing state of the vision system 268 by adjusting a tilt angle $\gamma$ of the forward imaging sensor 270a with respect to a vertical axis Z of the mobile teleconferencing robot 200 and/or a zoom level of the forward imaging sensor 270a based on the remote user input 204.

At block 1006, the method 1000 includes generating a combined video feed 354, 356 that provides an immersive peripheral view about the mobile teleconferencing robot 200. The combined video feed 354, 356 is generated by combining the forward video feed 274a, 276a with a portion of the right video feed 274b, 276b and a portion of the left video feed 274c, 276c. The combined video feed 354, 356 includes video feed dividers 358, 358a-b between the forward video feed 274a, 276a, the portion of the right video feed 274b, 276b, and the portion of the left video feed 274c, 276c. Each video feed divider 358, 358a-b has a position and a lean angle $\alpha$, $\alpha_a$, $\alpha_b$ with respect to a vertical viewing axis $\zeta$ based on the altered viewing state of the vision system 268. The lean angle $\alpha$, $\alpha_a$, $\alpha_b$ of each video feed divider 358, 358a-b may be based on the tilt angle $\gamma$ of the forward imaging sensor 270a. When the forward imaging sensor 270a is tilted upward (e.g., toward the ground surface 135), the video feed dividers 358, 358a-b lean toward each other, and top ends 358aa, 358ba of the video feed dividers 358, 358a-b are closer to each other than bottom ends 358ab, 358bb of the video feed dividers 358, 358a-b. When the forward imaging sensor 270a is tilted downward (e.g., away from the ground surface 135), the video feed dividers 358, 358a-b lean away from each other, and the top ends 358aa, 358ba of the video feed dividers 358, 358a-b are further apart from each other than the bottom ends 358ab, 358bb of the video feed dividers 358, 358a-b. Moreover, the position of each video feed divider 358, 358a-b may be based on the zoom level of the forward imaging sensor 270a. When the forward imaging sensor 270a is at a zoomed-in focal range, the video feed dividers 358, 358a-b are further apart from each other than when the forward imaging sensor 270a is at a zoomed-out focal range. At block 1008, the method 1000 also includes outputting the combined video feed 354, 356 from the robot 200 to a remote computing system 110, 300.

In some implementations, generating the combined video feed 354, 356 includes selecting the portion of the right video feed 274b, 276b and the portion of the left video feed 274c, 276c based on at least one of the tilt angle $\gamma$ of the forward imaging sensor 270a, the zoom level of the forward imaging sensor 270a, or an offset of the vertical field of view 272av of the forward imaging sensor 270a relative to the field of view 272b of the right imaging sensor 270b and/or the field of view 272c of the left imaging sensor 270c relative to a viewing horizon. The generating of the combined video feed 354, 356 may also include scaling the right video feed 274b, 276b and the left video feed 274c, 276c to each have a similar scale of the forward video feed 274a, 276a and arranging the portion of the right video feed 274b, 276b and the portion of the left video feed 274c, 276c relative to the forward video feed 274a, 276a. In some examples, the method includes at least one of correcting wide angle distortion, color matching, blending, or scaling of the video feeds 274a-c, 276a-c.

In some implementations, generating the combined video feed 354, 356 includes correcting wide angle distortion of the video feeds 274a-c, mapping the distortion corrected right and left video feeds 274a-c onto a hemispherical surface, cropping and/or scaling the distortion corrected right and left video feeds 274a-c, and overlaying the distortion corrected video feeds 276a-c. The distortion corrected video feeds 276a-c each have a right edge 276ar-cr and a left edge 276a1-c1 (see FIGS. 8A and 9). The left edge 276b1 of the right video feed 276b is arranged relative to the right edge 276ar of the forward video feed 276a and a right video feed divider 358a therebetween. Similarly, the right edge 376cr of the left video feed 276c is arranged relative to the left edge 276a1 of the forward video feed 276a and a left video feed divider 358b therebetween. In some examples, the method includes horizontally compressing the distortion corrected distortion corrected video feeds 276a-c prior to cropping and/or scaling the distortion corrected distortion corrected video feeds 276a-c. Correcting the wide angle distortion of the video feeds 274a-c may include mapping pixels of the forward video feed 274a to a tangent plane, fitting the pixels of the forward video feed 274a into a corresponding grid 410 of the tangent plane (as previously discussed with reference to FIG. 4B), and cropping the mapped and fitted forward video feed 274a to fit an aspect ratio to provide a corrected forward video feed 276a. Correcting the wide angle distortion of the video feeds 274 may also include dewarping the right and left video feeds 274b-c (e.g., to panoramic video feeds) and texture-mapping the dewarped right and left video feeds 274b-c onto a spherical surface to provide corrected right and left video feeds 276b-c.

Figure 11:
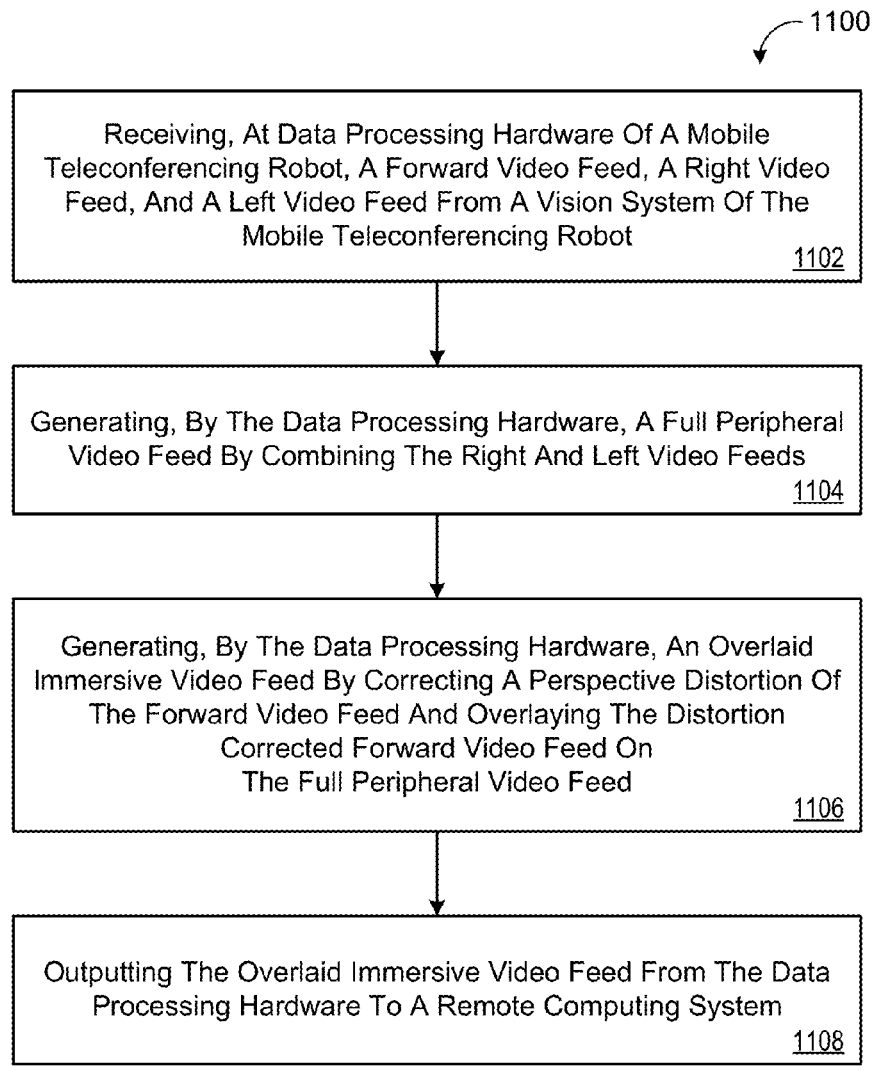
FIG. 11 is block diagram of an exemplary arrangement of operation for providing an immersive peripheral video feed for real-time viewing based on image data from a robot.
Figure 12:
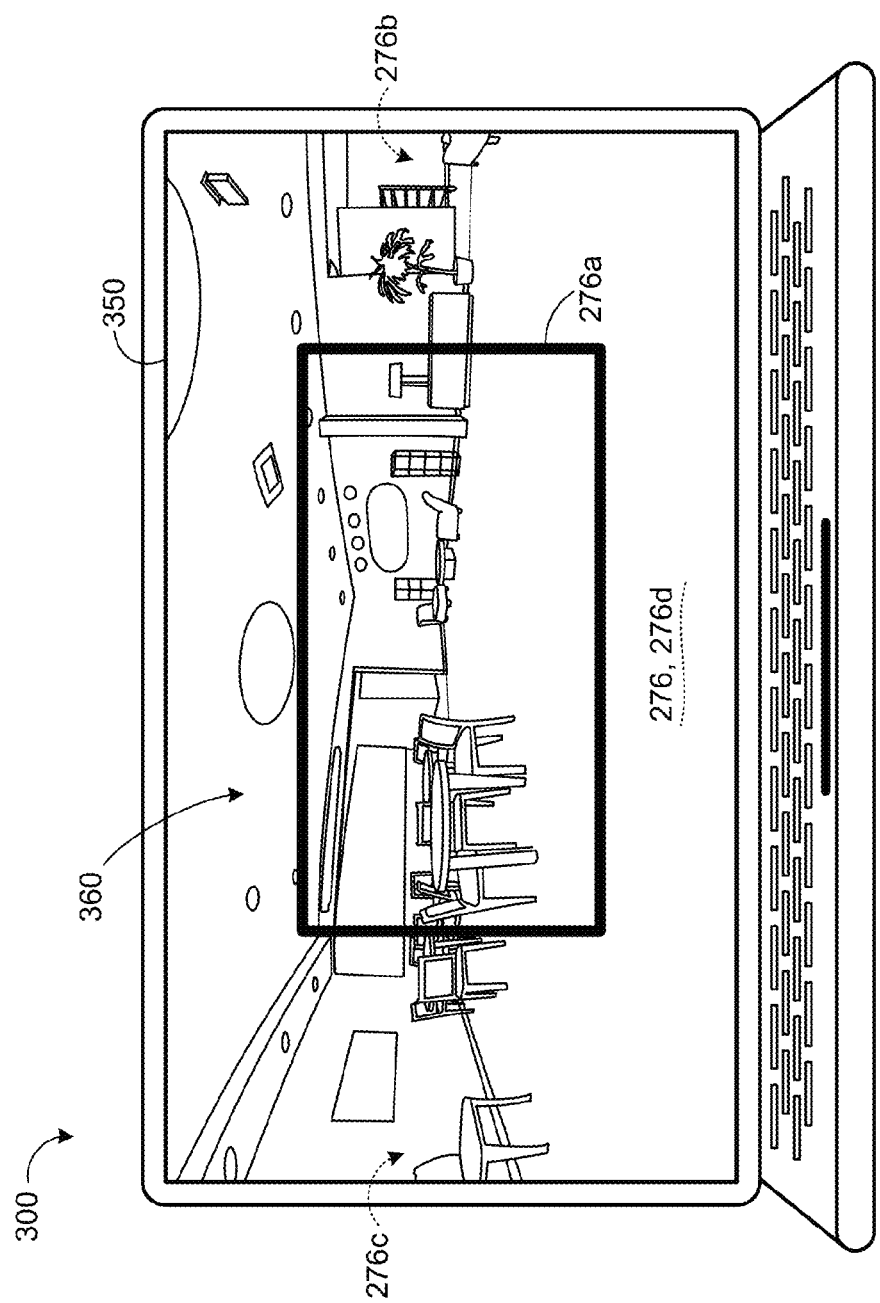
FIG. 12 is a front view of an example user device displaying an immersive peripheral video feed generated using the operations illustrated in FIG. 11.

Referring to FIGS. 11 and 12, in some implementations, a method 1100 for providing an immersive peripheral video feed for real-time viewing, such as on the screen 350 of the user device 300. At block 1102, the method 1100 includes receiving, at data processing hardware 282 of a mobile teleconferencing robot 200, a forward video feed 274a, a right video feed 274b, and a left video feed 274c from the vision system 268 of the mobile teleconferencing robot 200. At block 1104, the method 1100 further includes generating, by the data processing hardware 282, a full peripheral video feed 276d by combining the right and left video feeds 274a, 274b and, at block 1106, generating, by the data processing hardware 282, an overlaid immersive video feed 360 by correcting a wide angle distortion of the forward video feed 274a and overlaying the distortion corrected forward video feed 276a on the full peripheral video feed 276d. The overlaid immersive video feed 360 provides a forward and peripheral view about the mobile teleconferencing robot 200. At block 1108, the method 1100 includes outputting the overlaid immersive video feed 360 from the data processing hardware 282 to a remote computing system 110, 300. "Overlay" here does not mean matching features from the forward video feed 274a, 276a with features from the right video feed 274b, 276b and/or the left video feed 274c, 276c and laying one feed over the other to create an uninterrupted panoramic view. Instead, here, overlay means combining portions of the forward and peripheral video feeds 274a-c, 276a-c so that they are sized similarly and so that their horizons align where the video feeds are abutted at the video feed dividers 358.

In some implementations, generating the full peripheral video feed 276d includes dewarping the right and left video feeds 274b-c and texture-mapping the dewarped right and left video feeds 274b-c onto a spherical surface to provide corrected right and left video feeds 276b-c that the data processing hardware 282 combines to form the full peripheral video feed 276d. In some implementations, a second wide angle forward looking camera (not shown) is affixed to look straight ahead in the forward direction of the robot 200 and the processed video feed from the second wide angle forward looking camera is combined with the processed right and left video feeds 276b-c for a stitched panoramic view in front of which is positioned the corrected forward video feed 276a from the forward looking imaging sensor 270a. The method 1100, in some examples, includes blending the video feeds 276a-c, in terms of color gradients and size, so that the immersive video feed 360 does not have abrupt changes in appearance, thus enhancing the immersive experience for the user 10. The wide angle distortion of the forward video feed 274a can be corrected by the methods described earlier with reference to FIGS. 4A-4E. A placement location of the distortion corrected forward video feed 276a on the full peripheral video feed 276d is based on the tilt angle γ of the forward imaging sensor 270a with respect to the vertical axis Z of the mobile teleconferencing robot 200. Moreover, a scale of the distortion corrected forward video feed 276a is based on a zoom level of the forward imaging sensor 270a. In implementations, the combined video feed spans at least a 220 degree horizontal field of view that enables the user 10 to drive the robot 200 up to the middle of a long table and still view people seated directly adjacent the robot 200 as well as at either end.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A method comprising:
   receiving, at a mobile teleconferencing robot maneuverable across a ground surface, a remote user input to alter a viewing state of a vision system of the mobile teleconferencing robot, the vision system comprising:
      a forward imaging sensor arranged on a top portion of the mobile teleconferencing robot at a first location to have a forward field of view aimed along a forward drive direction of the mobile teleconferencing robot and configured to capture a forward video feed;
      a right imaging sensor arranged on a right portion of the mobile teleconferencing robot at a second location vertically apart from the first location to have a right field of view aimed in a right direction with respect to the forward drive direction, the right imaging sensor configured to capture a right video feed; and
      a left imaging sensor arranged on a left portion of the mobile teleconferencing robot at a third location vertically apart from the first location to have a left field of view aimed in a left direction with respect to the forward drive direction, the left imaging sensor configured to capture a left video feed;
   altering the viewing state of the vision system by adjusting a tilt angle of the forward imaging sensor with respect to a vertical axis of the mobile teleconferencing robot and/or a zoom level of the forward imaging sensor based on the remote user input;
   generating a combined video feed that provides an immersive peripheral view about the mobile teleconferencing robot by combining the forward video feed with a portion of the right video feed and a portion of the left video feed, the combined video feed comprising video feed dividers between the forward video feed, the portion of the right video feed, and the portion of the left video feed, each video feed divider having a position and a lean angle with respect to a vertical viewing axis based on the altered viewing state of the vision system; and
   outputting the combined video feed from the mobile teleconferencing robot to a remote computing system.

2. The method of claim 1, wherein the right and left imaging sensors are aimed away from each other and at least partially away from the forward drive direction, and the right and left fields of view at least partially overlap the forward field of view.

3. The method of claim 1, wherein the lean angle of each video feed divider is based on the tilt angle of the forward imaging sensor;
   when the forward imaging sensor is tilted upward, the video feed dividers lean toward each other, and top ends of the video feed dividers are closer to each other than bottom ends of the video feed dividers; and
   when the forward imaging sensor is tilted downward, the video feed dividers lean away from each other, and the top ends of the video feed dividers are further apart from each other than the bottom ends of the video feed dividers.

4. The method of claim 1, wherein the position of each video feed divider is based on the zoom level of the forward imaging sensor, and when the forward imaging sensor is at a zoomed-in focal range, the video feed dividers are further apart from each other than when the forward imaging sensor is at a zoomed-out focal range.

5. The method of claim 1, wherein the forward imaging sensor comprises a wide-angle lens and the forward field of view comprises a horizontal field of view of about 100 degrees.

6. The method of claim 1, wherein the right and left imaging sensors each comprise a fish-eye lens, and the right and left fields of view each comprise a horizontal field of view of about 180 degrees and a vertical field of view of about 135 degrees and a combined horizontal field of view of the combined video feed spans at least 220 degrees.

7. The method of claim 1, wherein generating the combined video feed comprises:
   selecting the portion of the right video feed and the portion of the left video feed based on at least one of the tilt angle of the forward imaging sensor, the zoom level of the forward imaging sensor, or a vertical field of view offset of the forward imaging sensor relative to a viewing horizon;
   scaling the right video feed and the left video feed to each have a similar scale of the forward video feed; and
   arranging the portion of the right video feed and the portion of the left video feed relative to the forward video feed.

8. The method of claim 1, wherein generating the combined video feed comprises at least one of correcting wide angle distortion of the video feeds, color matching the video feeds, blending the video feeds, or scaling the video feeds.

9. The method of claim 1, wherein generating the combined video feed further comprises:
   correcting wide angle distortion of the video feeds;
   mapping the distortion corrected right and left video feeds onto a hemispherical surface;
   cropping and/or scaling the distortion corrected right and left video feeds; and
   overlaying the distortion corrected video feeds, the distortion corrected video feeds each having a right edge and a left edge, the left edge of the right video feed arranged relative to the right edge of the forward video feed and a right video feed divider therebetween, and the right edge of the left video feed arranged relative to the left edge of the forward video feed and a left video feed divider therebetween.

10. The method of claim 9, wherein correcting the wide angle distortion of the video feeds comprises:
    mapping pixels of the forward video feed to a tangent plane;
    fitting the pixels of the forward video feed into a corresponding grid of the tangent plane;
    cropping the mapped and fitted forward video feed to fit an aspect ratio;
    dewarping the right and left video feeds; and
    texture-mapping the dewarped right and left video feeds onto a spherical surface.

11. A robot comprising:
    a robot body defining a forward drive direction;
    a robot head supported by the robot body, the robot head having a top portion, a right-side portion, and a left-side portion;
    a forward imaging sensor moveably disposed on the top portion of the robot head at a first location and aimed along the forward drive direction, the forward imaging sensor configured to capture a forward video feed;
    a right imaging sensor disposed on the right-side portion of the robot head at a second location vertically spaced from the first location with respect to a ground surface supporting the robot, the right imaging sensor aimed outward from a right portion of the teleconferencing robot and arranged to have a right field of view aimed at least partially away from the forward drive direction, the right imaging sensor configured to capture a right video feed;
  a left imaging sensor disposed on the left-side portion of the robot head at a third location vertically spaced from the first location with respect to the ground surface, the left imaging sensor aimed outward from a left portion of the teleconferencing robot and arranged to have a left field of view aimed at least partially away from the forward drive direction, the left imaging sensor configured to capture a left video feed; and
  data processing hardware in communication the forward imaging sensor, the right imaging sensor, and the left imaging sensor, wherein the data processing hardware is configured to generate a combined video feed that provides an immersive peripheral view about the robot by combining the forward video feed with a portion of the right video feed and a portion of the left video feed, the combined video feed comprising video feed dividers between the forward video feed, the portion of the right video feed, and the portion of the left video feed, each video feed divider having a position and a lean angle with respect to a vertical viewing axis based on a tilt angle of the forward imaging sensor with respect to a vertical axis of the robot and/or a zoom level of the forward imaging sensor.

12. The robot of claim 11, further comprising a drive system supporting the robot body on the ground surface and configured to maneuver the robot across the ground surface while the imaging sensors capture corresponding video feeds.

13. The robot of claim 11, wherein each video feed divider has a top end and a bottom end,
  when the forward imaging sensor is tilted upward, the video feed dividers lean toward each other, and the top ends of the video feed dividers are closer to each other than the bottom ends of the video feed dividers, and
  when the forward imaging sensor is tilted downward, the video feed dividers lean away from each other, and the top ends of the video feed dividers are further apart from each other than the bottom ends of the video feed dividers.

14. The robot of claim 11, wherein when the forward imaging sensor is at a zoomed-in focal range, the video feed dividers are further apart from each other than when the forward imaging sensor is at a zoomed-out focal range.

15. The robot of claim 11, wherein the forward imaging sensor comprises a wide-angle lens and the forward field of view comprises a horizontal field of view of about 100 degrees.

16. The robot of claim 11, wherein the right and left imaging sensors each comprise a fish-eye lens, and the right and left fields of view each comprise a horizontal field of view of about 180 degrees and a vertical field of view of about 135 degrees.

17. The robot of claim 11, wherein the right and left imaging sensors are aimed away from each other in opposite directions, the right and left fields of view each capturing a hemispherical field of view.

18. The robot of claim 17, wherein the right and left imaging sensors are positioned at a common vertical height with respect to the ground surface.

19. The robot of claim 11, wherein generating the combined video feed comprises:
  selecting the portion of the right video feed and the portion of the left video feed based on at least one of the tilt angle of the forward imaging sensor, the zoom level of the forward imaging sensor, or a vertical field of view offset of the forward imaging sensor relative to a viewing horizon;
  scaling the right video feed and the left video feed to each have a similar scale of the forward video feed; and
  arranging the portion of the right video feed and the portion of the left video feed relative to the forward video feed.

20. The robot of claim 11, wherein generating the combined video feed comprises at least one of correcting wide angle distortion of the video feeds, color matching the video feeds, blending the video feeds, or scaling the video feeds.

21. A method comprising:
  receiving, at data processing hardware of a mobile teleconferencing robot, a forward video feed, a right video feed, and a left video feed from a vision system of the mobile teleconferencing robot, the vision system comprising:
    a forward imaging sensor arranged on a top portion of the mobile teleconferencing robot at a first location to have a forward field of view aimed along a forward drive direction of the mobile teleconferencing robot and configured to capture the forward video feed;
    a right imaging sensor arranged on a right portion of the mobile teleconferencing robot at a second location apart from the first location to have a right field of view aimed at least partially away from the forward drive direction, the right imaging sensor configured to capture the right video feed; and
    a left imaging sensor arranged on a left portion of the mobile teleconferencing robot at a third location apart from the first location to have a left field of view aimed at least partially away from the forward drive direction, the left imaging sensor configured to capture the left video feed,
    wherein the right field of view and the left field of view each have a horizontal field of view of about 180 degrees;
  generating, by the data processing hardware, a full peripheral video feed by combining the right and left video feeds;
  generating, by the data processing hardware, an overlaid immersive video feed by:
    correcting a wide angle distortion of the forward video feed; and
    overlaying the distortion corrected forward video feed on the full peripheral video feed, the overlaid immersive video feed providing a forward and peripheral view about the mobile teleconferencing robot; and
  outputting the overlaid immersive video feed from the data processing hardware to a remote computing system.

22. The method of claim 21, wherein the forward imaging sensor comprises a wide-angle lens and the forward field of view comprises a horizontal field of view of about 100 degrees.

23. The method of claim 21, wherein the right and left imaging sensors each comprise a fish-eye lens, and the right and left fields of view each comprise a vertical field of view of about 135 degrees.

24. The method of claim 21, wherein the right and left imaging sensors are vertically spaced from the forward imaging sensor with respect to a ground surface supporting the mobile teleconferencing robot.

25. The method of claim 24, wherein the right and left imaging sensors have about the same vertical height with respect to the ground surface and are arranged to have the right field of view and the left field of view aiming in substantially opposite directions.

26. The method of claim 21, wherein generating the full peripheral video feed comprises:
   dewarping the right and left video feeds; and
   texture-mapping the dewarped right and left video feeds onto a spherical surface.

27. The method of claim 21, wherein correcting the wide angle distortion of the forward video feed comprises:
   mapping pixels of the forward video feed to a tangent plane;
   fitting the pixels of the forward video feed into a corresponding grid of the tangent plane; and
   cropping the mapped and fitted forward video feed to fit an aspect ratio.

28. The method of claim 21, wherein correcting the wide angle distortion of the forward video feed comprises adjusting a normalized radius of each pixel of the forward video feed using a polynomial equation.

29. The method of claim 21, wherein a placement location of the distortion corrected forward video feed on the full peripheral video feed is based on a tilt angle of the forward imaging sensor with respect to a vertical axis of the mobile teleconferencing robot.

30. The method of claim 21, wherein a scale of the distortion corrected forward video feed is based on a zoom level of the forward imaging sensor.

* * * * *